(12) United States Patent
Sakiyama et al.

(10) Patent No.: US 11,947,322 B2
(45) Date of Patent: Apr. 2, 2024

(54) FACTORY SYSTEM FOR MACHINE LEARNING OF AN ACTUATOR

(71) Applicant: KABUSHIKI KAISHA YASKAWA DENKI, Kitakyushu (JP)

(72) Inventors: Takafumi Sakiyama, Fukuoka (JP); Tadasuke Yuba, Fukuoka (JP); Nobuhiro Umeda, Fukuoka (JP); Naoyoshi Ishibashi, Fukuoka (JP)

( * ) Notice: Subject to any disclaimer, the term of this patent is extended or adjusted under 35 U.S.C. 154(b) by 905 days.

(21) Appl. No.: 16/877,491

(22) Filed: May 19, 2020

(65) Prior Publication Data

US 2020/0278646 A1    Sep. 3, 2020

Related U.S. Application Data

(63) Continuation of application No. PCT/JP2018/043603, filed on Nov. 27, 2018.

(30) Foreign Application Priority Data

Nov. 28, 2017  (JP) ................................. 2017-227874

(51) Int. Cl.
G05B 13/02        (2006.01)
B25J 9/16         (2006.01)
(Continued)

(52) U.S. Cl.
CPC ........ G05B 13/0265 (2013.01); B25J 9/1605 (2013.01); B25J 9/163 (2013.01);
(Continued)

(58) Field of Classification Search
CPC .. G05B 13/0265; G05B 13/048; G05B 23/02; B25J 9/1605; B25J 9/163; B25J 9/1674;
(Continued)

(56) References Cited

U.S. PATENT DOCUMENTS

2003/0229471 A1*  12/2003  Guralnik ............ G08B 21/0423
                                                    702/182
2007/0073422 A1    3/2007  Gaikwad et al.
(Continued)

FOREIGN PATENT DOCUMENTS

CN    101317141    12/2008
CN    201681071    12/2010
(Continued)

OTHER PUBLICATIONS

Extended Search Report in corresponding European Application No. 18882680.4 dated Jul. 13, 2021.
(Continued)

*Primary Examiner* — Christopher E. Everett
(74) *Attorney, Agent, or Firm* — SOEI PATENT & LAW FIRM

(57) ABSTRACT

A control system includes a factory system to control an actuator, and a learning system. The learning system extracts records for machine learning associated with the actuator from the factory system via a network, and generates an estimation model for estimating a condition of the actuator by machine learning using the records. The factory system includes a plurality of nodes including a control device to control the actuator, and a readable data construction device connected to the learning system via the network. The readable data construction device acquires data items associated with the actuator from at least one of the nodes other than the readable data construction device, and constructs readable data which is readable from the learning system. The readable data includes the data items associated with the actuator, and the learning system extracts the records from the readable data.

20 Claims, 15 Drawing Sheets

(51) Int. Cl.
  *G05B 13/04* (2006.01)
  *G06N 5/04* (2023.01)
  *G06N 20/00* (2019.01)

(52) U.S. Cl.
  CPC .......... *B25J 9/1674* (2013.01); *B25J 9/1692* (2013.01); *G05B 13/048* (2013.01); *G06N 5/04* (2013.01); *G06N 20/00* (2019.01)

(58) Field of Classification Search
  CPC ......... B25J 9/1692; G06N 5/04; G06N 20/00; Y02P 90/02; H02P 29/00
  See application file for complete search history.

(56) References Cited

U.S. PATENT DOCUMENTS

| | | | |
|---|---|---|---|
| 2007/0234781 | A1 | 10/2007 | Yamada et al. |
| 2013/0024172 | A1* | 1/2013 | Suyama ............. G05B 23/0254 703/2 |
| 2014/0277604 | A1* | 9/2014 | Nixon ................ G05B 19/4185 700/47 |
| 2014/0337429 | A1* | 11/2014 | Asenjo ..................... H04L 67/10 709/204 |
| 2016/0098647 | A1 | 4/2016 | Nixon et al. |
| 2016/0292512 | A1 | 10/2016 | Kanna et al. |
| 2016/0292895 | A1 | 10/2016 | Billi et al. |
| 2017/0031329 | A1* | 2/2017 | Inagaki .................... G06N 3/08 |
| 2017/0032283 | A1 | 2/2017 | Kamiya |
| 2017/0102696 | A1 | 4/2017 | Bell et al. |
| 2017/0139398 | A1 | 5/2017 | Tsuzuki et al. |
| 2017/0242076 | A1 | 8/2017 | Yoshiura |
| 2017/0308052 | A1 | 10/2017 | Kajiyama |
| 2019/0064787 | A1* | 2/2019 | Maturana ........... G05B 23/0227 |
| 2019/0087186 | A1 | 3/2019 | Endo |

FOREIGN PATENT DOCUMENTS

| | | |
|---|---|---|
| CN | 105487501 | 4/2016 |
| CN | 106020138 | 10/2016 |
| CN | 106392772 | 2/2017 |
| CN | 107303675 | 10/2017 |
| EP | 2835704 | 2/2015 |
| JP | 2009-116406 | 5/2009 |
| JP | 2016-191973 | 11/2016 |
| JP | 2017-033239 | 2/2017 |
| JP | 2017-076386 | 4/2017 |
| JP | 2017-097839 | 6/2017 |
| JP | 2017-151598 | 8/2017 |
| JP | 2017-199077 | 11/2017 |
| WO | 2007/040953 | 4/2007 |
| WO | 2016/144586 | 9/2016 |
| WO | 2017/163569 | 9/2017 |

OTHER PUBLICATIONS

Office Action issued in European Patent Application No. 18882680.4, dated Jun. 2, 2022.
Office Action issued in Japanese Patent Application No. P2021-130092 dated Mar. 14, 2023 (with English partial translation).
International Search Report dated Mar. 5, 2019 for PCT/JP2018/043603.
International Preliminary Report on Patentability with Written Opinion dated Jun. 11, 2020 for PCT/JP2018/043603.
Office Action issued in Japanese Patent Application No. P2021-130092, dated Oct. 11, 2022 (with English partial translation).
Office Action issued in Japanese Patent Application No. P2019-557240, dated Mar. 16, 2021 (with English partial translation).
Office Action issued in Chinese Patent Application No. 201880076376.7, dated Feb. 15, 2023 (with English partial translation).
Office Action issued in Chinese Patent Application No. 201880076376.7, dated Aug. 23, 2023 (with English partial translation).

* cited by examiner

FACTORY SYSTEM FOR MACHINE LEARNING OF AN ACTUATOR

CROSS-REFERENCE TO RELATED APPLICATIONS

This application is a continuation application of PCT Application No. PCT/JP2018/043603, filed on Nov. 27, 2018, which claims the benefit of priority from Japanese Patent Application No. 2017-227874, filed on Nov. 28, 2017, the entire contents of which are incorporated herein by reference.

BACKGROUND

1. Field

The present disclosure relates to a control system, a factory system, learning system, an estimation model generation method, and an actuator state estimation method.

2. Description of the Related Art

Japanese Unexamined Patent Publication No. 2017-97839 discloses an abnormality analysis system including a plurality of production facilities each including one or more detectors, a first network installed in a predetermined area, and an analysis device configured to perform a data analysis based on the detector information acquired via the first network, and generate deter ruination information associated with each abnormality of the plurality of production facilities or abnormality of the production target based on data analysis results.

SUMMARY

An example control system disclosed herein may include a factory system configured to control an actuator, and a learning system configured to extract records for machine learning associated with the actuator from the factory system via a network and to generate an estimation model for estimating a condition of the actuator by machine learning using the records. The factory system may include a plurality of nodes including a control device to control the actuator, and a readable data construction device connected to the learning system via the network. The readable data construction device may be configured to acquire data items associated with the actuator from at least one of the nodes other than the readable data construction device, and to construct readable data which is readable from the learning system, the readable data including the acquired data items. The learning system may be configured to extract the records from the readable data.

An example factory system disclosed herein may be connected to a learning system for machine learning via a network. The factory system may include a plurality of nodes including a control device configured to control an actuator, and a readable data construction device connected to the learning system via the network. The readable data construction device may be configured to acquire data items associated with the actuator from at least one of the nodes other than the readable data construction device, and to construct readable data which is readable from the learning system, the readable data including the data items. The learning system may extract records for machine learning from the readable data and generate an estimation model for estimating a condition of the actuator based, at least in part, on the records for machine learning. At least one of the plurality of nodes may be configured to estimate a condition of the actuator based, at least in part, on the estimation model.

An example method disclosed herein may include acquiring data items associated with an actuator of a factory system from at least one of a plurality of nodes of the factory system, the plurality of nodes including a control device to control the actuator. The method may further include constructing readable data which is readable from a learning system, the readable data including the data items. The method may still further include storing the readable data in a data memory which is accessible from a learning system via a network, wherein the learning system extracts records for machine learning from the readable data and generates an estimation model for estimating a condition of the actuator based, at least in part, on the records for machine learning. The method may still further include estimating a condition of the actuator based, at least in part, on the estimation model.

DETAILED DESCRIPTION

Figure 1:
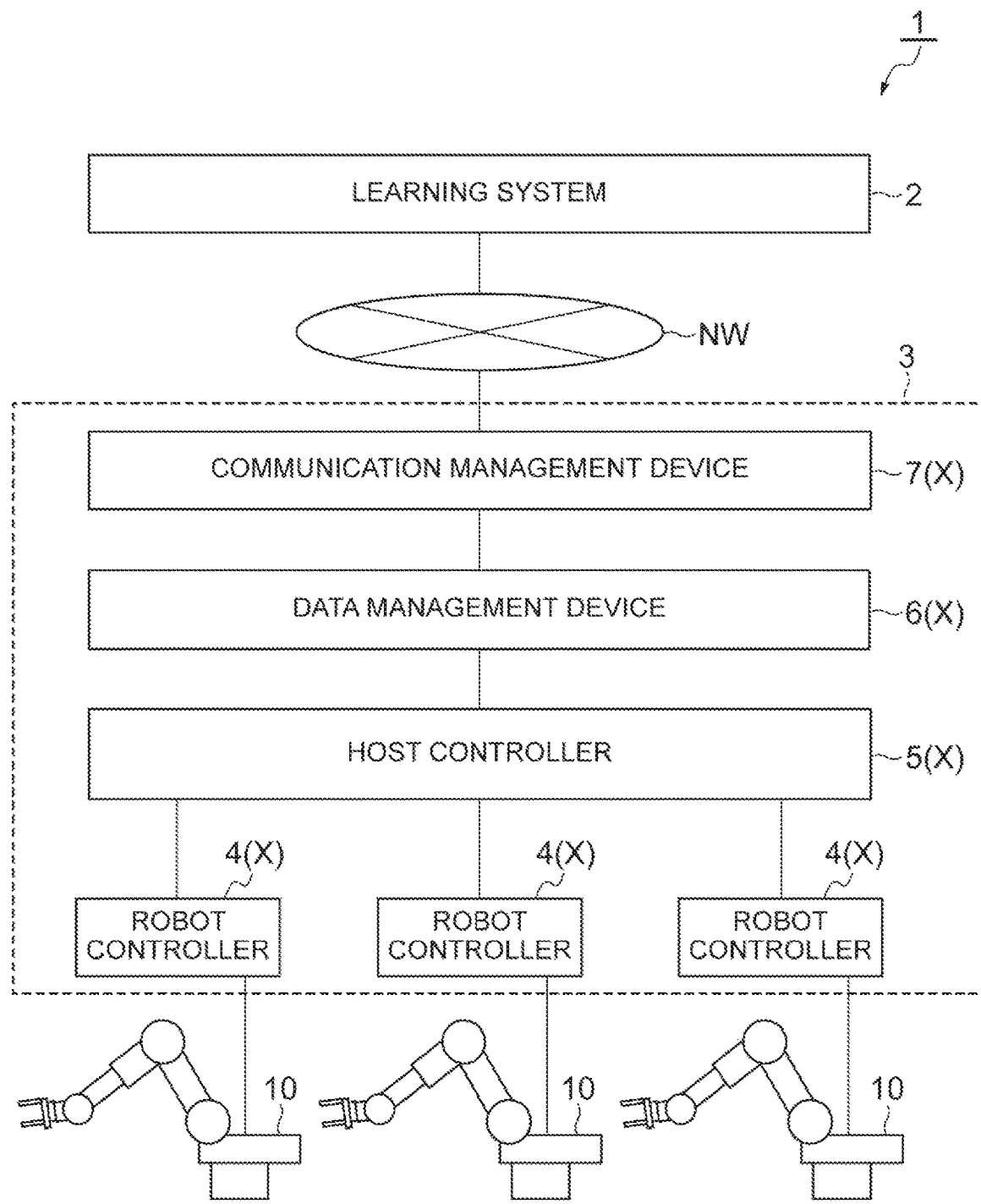
FIG. 1 is a schematic view illustrating an example configuration of a control system.

Hereinafter, with reference to the drawings, the same elements or similar elements having the same function are denoted by the same reference numerals, and redundant description will be omitted.

1. Control System

An example control system 1 controls an actuator of an industrial device (for example, a robot or an NC processing device) installed in a cell of a factory. As shown in FIG. 1, the control system 1 includes a learning system 2 and a factory system 3. The factory system 3 is provided in a factory and controls an actuator.

The factory system 3 has a plurality of nodes X including a control device that controls the actuator. The node X is a physical network node, and comprises an electronic device that performs data communication with another device via a wired or wireless communication line. For example, a plurality of nodes X includes a plurality of robot controllers 4 (control devices), a host controller 5 (control device), a data management device 6, and a communication management device 7. For convenience of explanation, FIG. 1 shows one host controller 5, however the factory system 3 may include a plurality of host controllers 5 provided in a plurality of cells, respectively. For example, the factory system 3 may include a plurality of data management devices 6 corresponding to the plurality of host controllers 5, respectively, and may provide a plurality of communication management devices 7 corresponding to the plurality of data management devices 6, respectively. In some examples, one data management device 6 may be provided for a plurality of host controllers 5, and one communication management device 7 may be provided for a plurality of data management devices 6.

Figure 2:
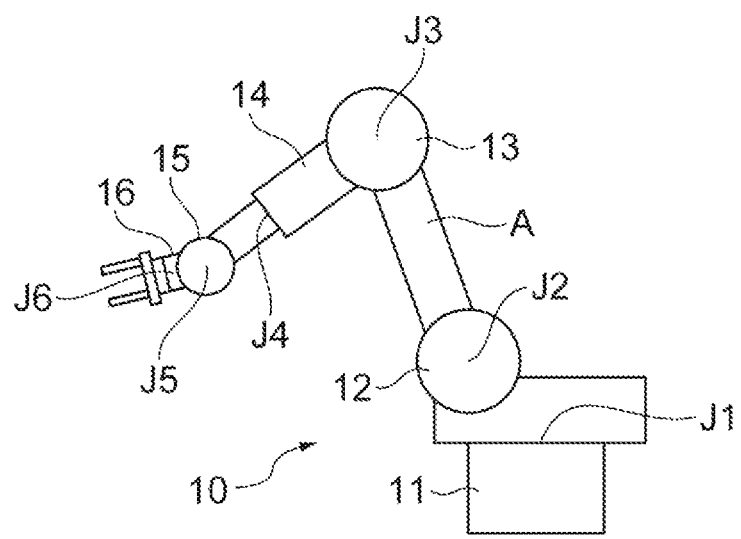
FIG. 2 is a schematic view illustrating an example configuration of a robot.
Figure 3:
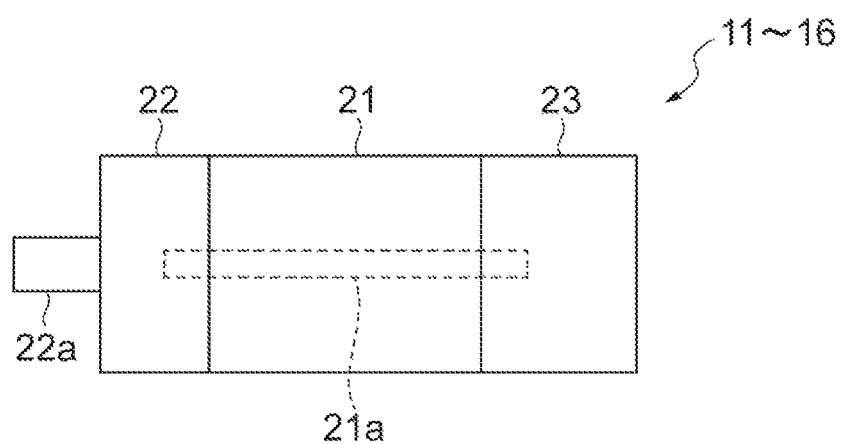
FIG. 3 is a schematic view illustrating an example configuration of an actuator.

The plurality of robot controllers 4 are nodes that control a plurality of robots 10 arranged in one cell, for example. As shown in FIG. 2, the robot 10 is, for example, a serial link type vertically articulated robot, and includes an arm A having a plurality (for example six) of joint axes J1, J2, J3, J4, J5, and J6, and a plurality of actuators 11, 12, 13, 14, 15, and 16 for adjusting the position and posture of the distal end of the arm A by driving the respective joint axes J1, J2, J3, J4, J5, and J6. As shown in FIG. 3, each of the actuators 11, 12, 13, 14, 15, and 16 includes a motor 21, a speed reducer 22, and a sensor 23. The motor 21 is, for example, a servomotor that rotates a shaft 21a according to a control command. The speed reducer 22 reduces the rotation of the shaft 21a and transmits the rotation to an output shaft 22a. The sensor 23 outputs a signal associated with the rotational position and rotational speed of the shaft 21a. For example, the sensor 23 is a rotary encoder that outputs a pulse signal having a frequency proportional to the rotational speed of the shaft 21a. The robot controller 4 outputs to the actuators 11, 12, 13, 14, 15, and 16 driving power for bringing the position and posture of the distal end of the arm A closer to the target position and posture.

Returning to FIG. 1, the host controller 5 (for example, a programmable logic controller) is a node that outputs the target position and the target posture to each of the plurality of robot controllers 4. The data management device 6 is a node that is connected to the host controller 5 and manages data associated with the actuators 11, 12, 13, 14, 15, and 16 of each robot 10. The communication management device 7 (readable data construction device) is the node that is connected to the learning system 2 via a network NW such as the Internet, and that manages data communication between the learning system 2 and the factory system 3 according to a predetermined standard (for example, OPC UA). The robot controllers 4, the host controller 5, and the data management device 6 are isolated from the network NW (the network between the learning system 2 and the factory system 3) by the communication management device 7.

The learning system 2 extracts, via the network NW, information (or records) for machine learning associated with actuators 11-16 from factory system 3, and generates an estimation model of the condition (or for estimating the condition) of the actuators 11, 12, 13, 14, 15, and 16 by machine learning using the information. The condition of the actuators 11, 12, 13, 14, 15, and 16 includes different types of information from the condition detected by sensing. An example of the condition of the actuators 11, 12, 13, 14, 15, and 16 is the iron powder concentration of the grease of the speed reducer 22. The conditions of the actuators 11, 12, 13, 14, 15, and 16 include the condition of the objects to be driven by the actuators 11, 12, 13, 14, 15, and 16 in addition to the condition of the actuators 11, 12, 13, 14, 15, and 16 themselves. In the network NW, the learning system 2 may be located in the area belonging to the operating entity of the factory system 3, or may be located in an area belonging to another entity.

Hereinafter, example configurations of the learning system 2 and the factory system 3 will be described in additional detail in which the learning system 2 generates the estimation model of the iron powder concentration, and the factory system 3 derives the recommended time for maintenance of the actuators 11, 12, 13, 14, 15, and 16 based on the estimation model.

(1) Learning System

Figure 4:
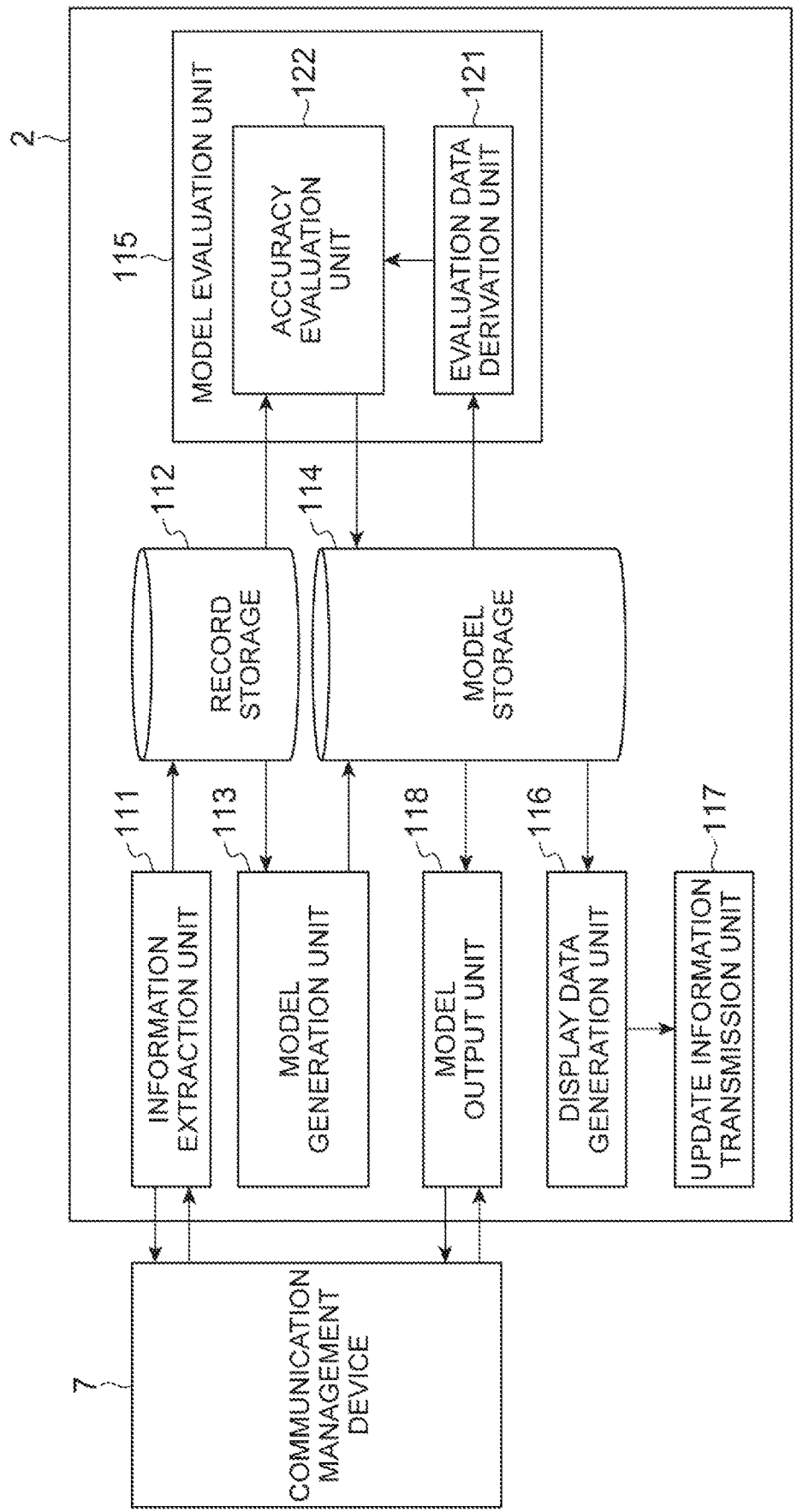
FIG. 4 is a block diagram illustrating an example configuration of a learning system.

As shown in FIG. 4, the learning system 2 includes, as a functional configuration (hereinafter, referred to as "functional module"), an information extraction unit 111, an information storage unit 112 (record storage), a model generation unit 113, a model storage 114 (second model storage), a model evaluation unit 115, a display data generation unit 116, an update information transmission unit 117, and a model output unit 118.

The information extraction unit 111 extracts information (or records) for machine learning associated with the actuators 11, 12, 13, 14, 15, and 16 from data (described in additional detail later) constructed by the communication management device 7 of the factory system 3. For example, the information extraction unit 111 extracts speed data associated with the rotational speed of the speed reducer 22, torque data associated with the torque acting on the speed reducer 22, and concentration data indicating the iron powder concentration of the grease of the speed reducer 22. In some examples, the information extraction unit 111 extracts information (hereinafter, referred to as "learning data") which is a set of the concentration data, and speed data and torque data for a certain period corresponding to the acquisition time of the concentration data. The information storage unit 112 stores the learning data extracted by the information extraction unit 111.

The model generation unit 113 generates the estimation model by machine learning using the information stored in the information storage unit 112. The estimation model is a program that outputs an estimation result of unknown condition of the actuators 11, 12, 13, 14, 15, and 16 according to the input of known condition of the actuators 11, 12, 13, 14, 15, and 16. For example the estimation model is configured to output an estimation of a condition of the actuators 11, 12, 13, 14, 15, and 16 in response to an input of a status of motion of the actuators 11, 12, 13, 14, 15, and 16. At least one of the records includes at least one data item indicating the status of motion and at least one data item indicating the condition of the actuators 11, 12, 13, 14, 15, and 16. The estimation model may be configured to output a predicted value of the concentration data (hereinafter, referred to as "predicted concentration data") according to the input of the speed data and the torque data. For example, the estimation model is a neural network connecting an input vector including the speed data and the torque data and an output vector including the concentration data. Model generation unit 113 uses a combination of the speed data and the torque data for a certain period included in the learning data and the concentration data included in the learning data as teacher data, and tunes the parameters of the estimation model (for example, weighting parameters of the nodes of the neural network) by machine learning processing such as deep learning. The estimation model may comprise a neural network or a program configured to output an estimation result according to a predetermined input. For example, the estimation model may comprise a function that returns a numerical value according to an input of an argument.

The model storage 114 stores the estimation model generated by the model generation unit 113. The model storage 114 may be configured to store a plurality of estimation models. The model evaluation unit 115 evaluates the estimation accuracy of each estimation model based on information (or the records for machine learning) stored in the information storage unit 112 and the estimation result of the conditions of actuators 11, 12, 13, 14, 15, and 16 using a plurality of estimation models. For example, a model evaluation unit 115 has the evaluation data derivation unit 121 and the accuracy evaluation unit 122 as more subdivided functional modules.

The evaluation data derivation unit 121 derives data for evaluation by inputting part of the information stored in the information storage unit 112 to one of estimation models (hereinafter, referred to as "evaluation target model"). For example, the evaluation data derivation unit 121 derives the predicted concentration data by inputting the speed data and the torque data of one of the learning data (hereinafter, referred to as "sample data") stored in the information storage unit 112 to the estimation model. In some examples, the evaluation data derivation unit 121 may be configured to select a sample record from the records for machine learning stored in the record storage, and to input at least one data item of the sample record indicating a status of motion of the actuator to the estimation models to derive the estimation results.

The accuracy evaluation unit 122 evaluates the estimation accuracy of the evaluation target model by comparing data derived by the evaluation data derivation unit 121 with the information of the condition of the actuators 11, 12, 13, 14, 15, and 16 included in the information stored in the information storage unit 112. In some examples, the accuracy evaluation unit 122 may compare the estimation results which are derived by the evaluation data derivation unit 121 with at least one data item of the sample record indicating a condition of the actuator to evaluate an estimation accuracy of the estimation models. For example, the accuracy evaluation unit 122 evaluates the estimation accuracy of the evaluation target model by comparing the predicted concentration data derived by the evaluation data derivation unit 121 and the concentration data included in the sample data (hereinafter, referred to as "measured concentration data"). Evaluation of the estimation accuracy includes quantifying the alienation of the predicted concentration data from the measured concentration data by a difference or a ratio. The accuracy evaluation unit 122 stores the evaluation result of the estimation accuracy of the evaluation target model in the model storage 114.

The display data generation unit 116 generates data (display data) for displaying identification information of a plurality of estimation models and the evaluation result of the estimation accuracy of the plurality of estimation models. The data may comprise image data or other types of data for which the estimation accuracy can be displayed. For example, the data may be text data.

When a new estimation model is added to the model storage 114, the update information transmission unit 117 transmits information of a plurality of estimation models including the estimation model to one of the nodes X of the factory system 3. The information of the estimation model includes the evaluation result of the estimation accuracy by the accuracy evaluation unit 122. For example, the update information transmission unit 117 transmits an e-mail displaying information of a plurality of estimation models to a portable terminal of an administrator of the factory system 3.

The model output unit 118 receives designation of the type of the estimation model from one of the nodes X of the factory system 3 (for example, the communication management device 7), and transmits the data of the estimation model according to the designation to the one node X.

(2) Factory System
(Robot Controller)

Figure 5:
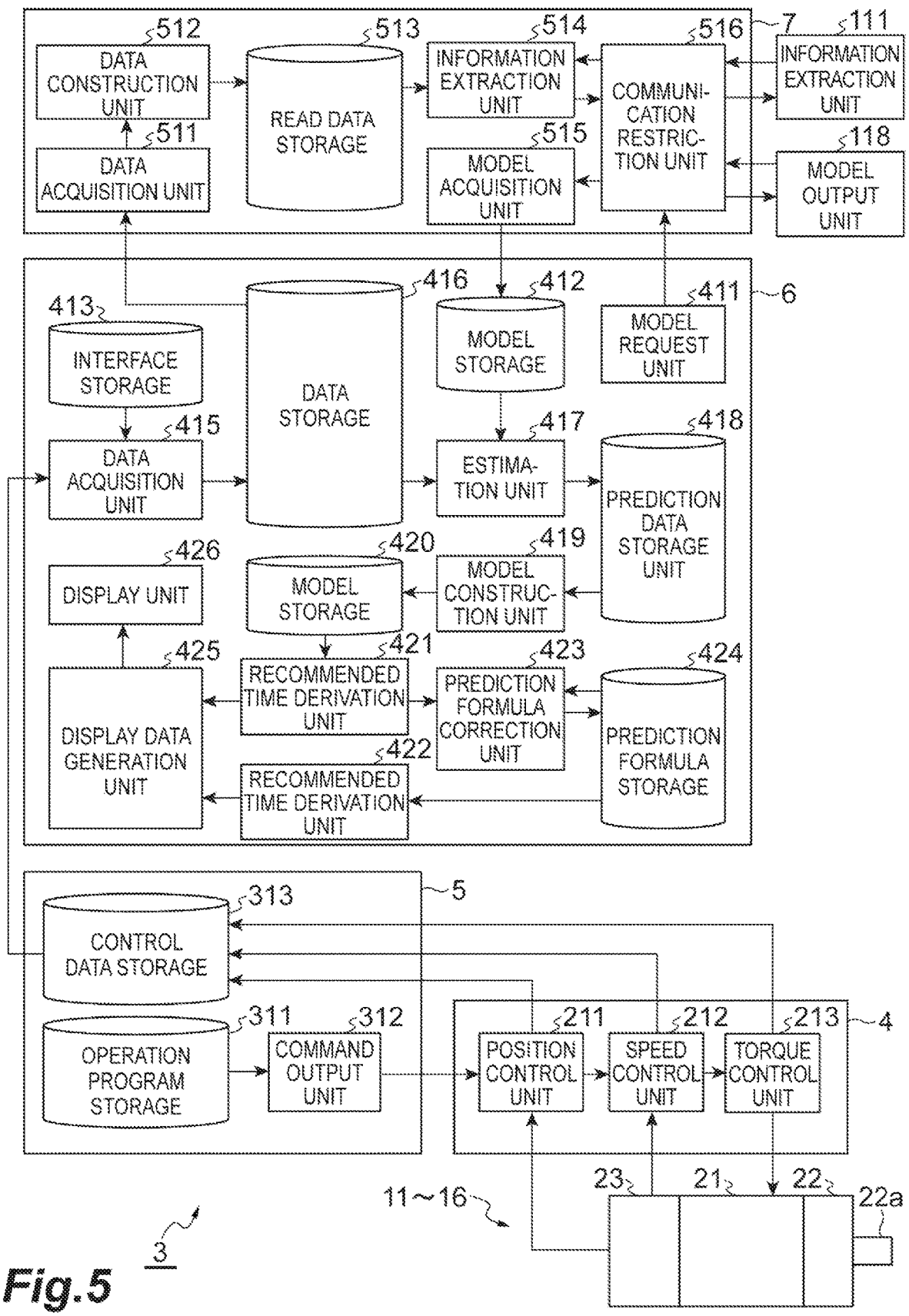
FIG. 5 is a block diagram illustrating an example configuration of a factory system.

As shown in FIG. 5, the robot controller 4 includes a position control unit 211, a speed control unit 212, and a torque control unit 213 as functional modules. The position control unit 211 generates a speed command value to make the current rotation angle of the actuators 11, 12, 13, 14, 15, and 16 (hereinafter, referred to as "current angle") closer to the target rotation angle (hereinafter, referred to as "target angle"). For example, the position control unit 211 performs a proportional operation, a proportional/integral operation, or a proportional/integral/differential operation on a deviation between the target angle and the current angle (hereinafter, referred to as "angle deviation") to generate the speed command value. Note that the position control unit 211 derives the target angles of the actuators 11, 12, 13, 14, 15, and 16 according to the target position and the target posture of the distal end of the arm A acquired from the host controller 5. Further, the position control unit 211 derives the current angle based on the feedback information from the sensor 23. For example, the position control unit 211 derives the current angle by counting the pulse signals output from the sensor 23. The position control unit 211 transmits history data in which the current time is associated with the target angle and the current angle to the host controller 5.

The speed control unit 212 generates a torque command value to make the current rotational speed of the actuators 11, 12, 13, 14, 15, and 16 (hereinafter, referred to as "current speed") closer to the speed command value generated by the position control unit 211. For example, the speed control unit 212 performs a proportional operation, a proportional/integral operation, or a proportional/integral/differential operation on a deviation between the speed command value and the current speed (hereinafter, referred to as a "speed deviation") to generate a torque command value. The speed control unit 212 derives the current speed based on the feedback information from the sensor 23. For example, the speed control unit 212 derives the current speed based on the frequency of the pulse signal output from the sensor 23. The speed control unit 212 transmits history data in which the current time is associated with the speed command value and the current speed to the host controller 5.

The torque control unit 213 outputs a drive current to the motor 21 so that the motor 21 generates a torque according to the torque command value generated by the speed control unit 212. The torque control unit 213 transmits history data in which the current time is associated with the torque command value and the drive current to the host controller 5.

When backlash occurs in the speed reducer 22 of the actuators 11, 12, 13, 14, 15, and 16, the backlash causes the respective parts of the speed reducer 22 and the robot 10 to vibrate. The inertial force generated in this vibration becomes a disturbance, and the above-described position deviation and speed deviation fluctuate. In order to suppress the fluctuation, the speed command value and the torque command value also fluctuate. That is, the fluctuation components of the speed command value and the torque command value include a fluctuation component caused by backlash.

(Host Controller)

The host controller 5 includes an operation program storage 311, a command output unit 312, and a control data storage 313 as functional modules. The operation program storage 311 stores an operation program for causing each robot 10 to perform a predetermined operation. The operation program includes a target position and a target posture (a target position and a target posture at the distal end of the arm A) arranged in time series.

The command output unit 312 sequentially outputs the operation program of the operation program storage 311 to the robot controller 4. The control data storage 313 stores the history data transmitted from the position control unit 211, the speed control unit 212, and the torque control unit 213 of the robot controller 4.

(Data Management Device)

The data management device 6 includes a functional module, a model request unit 411, a model storage 412 (first model storage), an interface storage 413, a data acquisition unit 415, a data storage 416, an estimation unit 417, a prediction data storage unit 418, a model construction unit 419, a model storage 420, recommended time derivation units 421, 422, a prediction formula correction unit 423, a prediction formula storage 424, a display data generation unit 425, and a display unit 426.

The model request unit 411 requests the model output unit 118 of the learning system 2 to transmit the data of the estimation model (hereinafter, referred to as "model data"). The model data may be the estimation model itself, or the model day may comprise a parameter for specifying the estimation model (for example, a weighting parameter of a neural network node). The model request unit 411 may be configured to designate the type of the estimation model when transmitting the model data.

The model storage 412 stores the estimation model generated by the learning system 2. The model storage 412 may be provided in one of the nodes X. For example, the model storage 412 may be provided in the robot controller 4, the host controller 5, or the communication management device 7 instead of the data management device 6.

The interface storage 413 stores an interface program for accessing data (or accessing data storage) in the host controller 5. For example, the interface storage 413 stores an interface program for accessing the history data of the control data storage 313. The interface program is, for example, an application programming interface (API). The API may be configured to read out predetermined data items from the storage of the robot controller 4 or the host controller 5. Since the interface storage 413 may be provided in the node X isolated from the network NW by the communication management device 7, it may be provided in the robot controller 4 or the host controller 5 instead the communication management device 7.

The data acquisition unit 415 repeatedly acquires the speed data and the torque data and saves the data in the data storage 416 in association with the acquisition time. For example, the data acquisition unit 415 reads the speed command value by the interface program of the interface storage 413, and acquires this as the speed data. Further, the data acquisition unit 415 reads the torque command value by the interface program of the interface storage 413, and acquires this as torque data. By using the interface program to acquire the speed data and torque data, unnecessary access to another storage area of the control data storage 313 (for example, the operation program storage 311) can be prevented. The data acquisition unit 415 may acquire the current speed as speed data and may acquire the drive current as torque data.

The data acquisition unit 415 acquires the measured concentration data when it is input, and stores it in the data storage 416 in association with the acquisition time. The measured concentration data is, for example, a concentration of iron powder measured by collecting grease from the speed reducer 22. The acquisition time of the measured concentration data may be the time at which the operator collected the grease, or may be the time at which the data acquisition unit 415 acquired the measured concentration data.

The estimation unit 417 estimates the condition of the actuators 11, 12, 13, 14, 15, and 16 based on the estimation model stored in the model storage 412. The estimation unit 417 is provided in any of the nodes X. For example, the estimation unit 417 may be provided in the robot controller 4, the host controller 5, or the communication management device 7 instead of the data management device 6. The estimation unit 417 estimates the deterioration level of the actuators 11, 12, 13, 14, 15, and 16. For example, the estimation unit 417 estimates the predicted concentration data based on the estimation model. In some examples, the estimation unit 417 may be configured to estimate a condition of the actuators 11, 12, 13, 14, 15, and 16 based, at least in part, on a present value of at least one of the data items indicating a state of motion of the actuators 11, 12, 13, 14, 15, and 16 and the estimation model stored in the model storage 412. In some examples, the estimation unit 417 acquires speed data and torque data (hereinafter, referred to as an "input data set") for a certain period from the data storage 416, and inputs the input data to the estimation model stored in the model storage 412 to derive the predicted concentration data. Each time the estimation unit 417 derives the predicted concentration data, it stores the predicted concentration data in the prediction data storage unit 418 in association with the prediction target time. The prediction target time may be the derivation completion time of the predicted concentration data, or may be a predetermined time that is determined before the derivation completion time.

The model construction unit 419 constructs a rising prediction model including a future chronological transition of the predicted concentration data based on the chronological transition of the predicted concentration data. For example, the model construction unit 419 determines whether the predetermined number of new predicted concentration data (predicted concentration data that is not used in the construction of the rising prediction model in the model construction unit 419) is stored in the prediction data storage unit 418. When it is determined that the predetermined number of new predicted concentration data has been stored, the model construction unit 419 constructs the rising prediction model of concentration data based on the predetermined number of predicted concentration data. The rising prediction model is, for example, a function indicating the relationship between the total drive time of the speed reducer 22 and the predicted concentration data. For example, the model construction unit 419 constructs the rising prediction model by performing polynomial interpolation or the like on the predetermined number of predicted concentration data. The model construction unit 419 stores the constructed rising prediction model in the model storage 420.

The recommended time derivation unit 421 derives a recommended time for maintenance of the speed reducer 22 based on the rising prediction model of the model storage 420. The recommended time for maintenance of the speed reducer 22 is, for example, a time at which the iron powder concentration of the grease of the speed reducer 22 reaches a predetermined threshold value. The threshold value is set in advance based on past results. For example, the recommended time derivation unit 421 derives the total drive time until the predicted concentration data reaches a predetermined threshold value as a recommended time for maintenance of the speed reducer 22 (hereinafter, referred to as a "first recommended time") based on the rising prediction model. The recommended time derivation unit 421 may derive, as the first recommended time, the total drive time until when the increasing speed of the grease iron powder concentration of the speed reducer 22 reaches a predetermined threshold value.

The prediction formula storage 424 stores a prediction formula for deriving a recommended time for maintenance of the speed reducer 22. The prediction formula is a mathematical expression indicating the relationship between the rotational speed of the speed reducer 22 and the torque acting on the speed reducer 22, and the recommended time for maintenance of the speed reducer 22. Examples of the prediction formula include a life prediction formula of the bearing of the speed reducer 22. For example, the prediction formula storage 424 stores the following prediction formula.

[Formula 1]
$$L = A \times K \times \frac{N_0}{N_n} \times \left(\frac{T_0}{T_n}\right)^P \quad (1)$$

L: Recommended time for maintenance (h)
A: Correction coefficient
K: Rated life of bearing of speed reducer 22 (h)
$N_0$: Rated speed of speed reducer 22 (rpm)
$N_n$: Rotational speed of speed reducer 22 per hour (rpm/h)
$T_0$: Rated torque of speed reducer 22 (Nm)
$T_n$: Torque of speed reducer 22 per hour (Nm/h)
P: Constant determined according to the type of speed reducer 22

The prediction formula correction unit 423 corrects the prediction formula to make the recommended time for maintenance of the speed reducer 22 derived based on the prediction formula (hereinafter, referred to as "second recommended time") closer to the first recommended time derived by the recommended time derivation unit 421. For example, the prediction formula correction unit 423 corrects the value of the correction coefficient A to make the second recommended time derived based on the above formula (1) closer to the first recommended time.

The recommended time derivation unit 422 derives the second recommended time based on the set values of the rotational speed of the speed reducer 22 and the torque acting on the speed reducer 22, and the prediction formula corrected by the prediction formula correction unit 423. The set values are input by, for example, an operator.

The display data generation unit 425 generates image data for displaying at least one of the first recommended time derived by the recommended time derivation unit 421 and the second recommended time derived by the recommended time derivation unit 422. The display unit 426 displays an image including one or both of the first recommended time and the second recommended time based on the image data generated by the display data generation unit 425.

(Communication Management Device)

The communication management device 7 includes, as a functional module, a data acquisition unit 511 (acquisition unit), a data construction unit 512, a read data storage 513, an information extraction unit 514, a model acquisition unit 515, and a communication restriction unit 516.

The data acquisition unit 511 acquires information for machine learning associated with the actuators 11, 12, 13, 14, 15, and 16 of the plurality of robots 10 from one of the nodes X other than the data acquisition unit 511. For example, the data acquisition unit 511 acquires, from the data storage 416 of the data management device 6, the information for machine learning (for example, data items associated with the actuators 11, 12, 13, 14, 15, and 16) read out from the control data storage 313 in the host controller 5 by the interface program stored in the interface storage 413.

In some examples, the communication management device 7 may be further configured to store the readable data in a data memory that is accessible from the learning system 2 via the network. The read data storage 513 stores the data in a state where it is readable from the learning system 2. The data construction unit 512 constructs data (or readable data which is readable from the learning system 2) including the information (or the data items) acquired by the data acquisition unit 511, and makes the data readable from the learning system 2. In some examples, the learning system 2 is configured to extract the records from the readable data. For example, the data construction unit 512 constructs data in which the information acquired by the data acquisition unit 511 is structured by classification information including identification information of the actuators 11, 12, 13, 14, 15, and 16. In some examples, the data construction unit 512 is configured to construct the data including the data items in association with labels. Each of the labels includes the identification of at least one of the actuators 11, 12, 13, 14, 15, and 16. Other classification information of the identification information of the actuators 11, 12, 13, 14, 15, and 16 includes the identification information of the factory cell, the identification information of the robot, the type of information, and the like. Examples of the type of information include the speed data, the torque data, the concentration data, and the like. For example, the data construction unit 512 constructs the data having a tree-like structure sequentially branched by cell identification information, robot identification information, actuator identification information, and information type, and stores the data in the read data storage 513. When the data has such a data structure, the information extraction unit 111 of the learning system 2 described above extracts the information for machine learning from the data by designating the classification information. In some examples, the information extraction unit 111 is configured to extract the records for machine learning from the readable data by designating a label and read out a data item corresponding to the label in the readable data.

The information extraction unit 514 extracts information corresponding to the designation of the classification information by the information extraction unit 111 of the learning system 2 from the data of the read data storage 513. The model acquisition unit 515 acquires the model data transmitted from the model output unit 118 in response to a request from the model request unit 411 of the data management device 6, and stores the model data in the model storage 412. When the model data is the estimation model itself, the model acquisition unit 515 saves the acquired model data over the model storage 412. When the model data is a parameter of the estimation model, the parameter of the estimation model stored in the model storage 412 is changed to the acquired parameter.

The communication restriction unit 516 is interposed between the information extraction unit 514, the model acquisition unit 515, and the model request unit 411 on the factory system 3 side, and the information extraction unit 111 and the model output unit 118 on the learning system 2 side. In some examples, the communication restriction unit 516 is configured to restrict communication between the factory system 3 side and the learning system 2 side. For example, when the communication restriction unit 516 receives data from the model output unit 118 that is different from the data associated with the request from the model request unit 411, it blocks the entry of the data, and prevents the data from being acquired by the model acquisition unit 515. Further, when acquiring, from the information extraction unit 514, data that does not correspond to the designation of the classification information from the information extraction unit 111, the communication restriction unit 516 blocks the leakage of the data, and prevents the data from being transmitted to the information extraction unit 111. In some examples, the communication restriction unit 516 may be configured to restrict a transmission of data, from the learning system 2 to the factory system 3, that is different from the estimation model corresponding to the model designation.

(3) Control System Hardware Configuration

Figure 6:
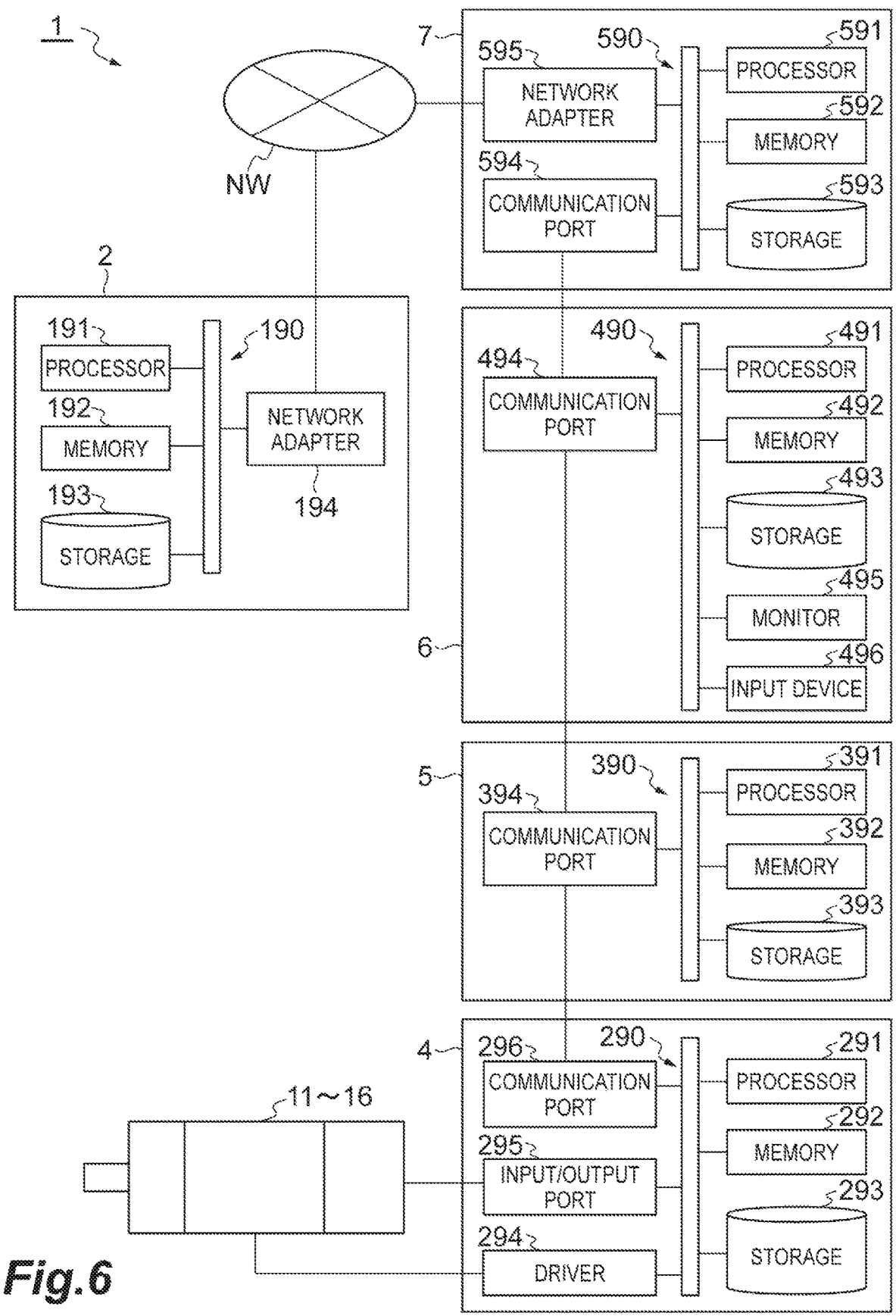
FIG. 6 is a block diagram illustrating an example hardware configuration of a robot system.

As shown in FIG. 6, the learning system 2 includes circuitry 190 that includes at least one processor 191, a memory 192, a storage 193, and a network adapter 194. The storage 193 is a computer readable non-volatile storage medium (for example, hard disk or flash memory). The storage 193 includes a storage area for a program for configuring respective functional modules of the learning system 2, and a storage area allocated to the information storage unit 112 and the model storage 114. The memory 192 temporarily stores the program loaded from the storage 193, the calculation result by the processor 191, and the like. The processor 191 executes the program in cooperation with the memory 192, and includes respective functional modules of the learning system 2. The network adapter 194 performs network communication via the network NW in accordance with a command from the processor 191.

The robot controller 4 includes circuitry 290 that includes the at least one processor 291, a memory 292, a storage 293, a driver 294, an input/output port 295, and a communication port 296. The storage 293 is a computer readable non-volatile storage medium (for example, hard disk or flash memory). The storage 293 stores a program for configuring respective functional modules of the robot controller 4. The memory 292 temporarily stores the program loaded from the storage 293, the calculation result by the processor 291, and the like. The processor 291 executes the program in cooperation with the memory 292, and includes respective functional modules of the robot controller 4. The driver 294 outputs driving power to the motor 21 of the actuators 11, 12, 13, 14, 15, and 16 in accordance with a command from the processor 291. The input/output port 295 acquires a signal from the sensor 23 in accordance with a command from the processor 291. The communication port 296 performs network communication with the host controller 5 in accordance with a command from a processor 291.

The host controller 5 has circuitry 390 that includes at least one processor 391, a memory 392, a storage 393, and a communication port 394. The storage 393 is a computer readable non-volatile storage medium (for example, hard disk or flash memory). The storage 393 includes a storage area of a program for configuring respective functional modules of the host controller 5, and a storage area allocated to the operation program storage 311 and the control data storage 313. The memory 392 temporarily stores the program loaded from the storage 393, the calculation result by the processor 391, and the like. The processor 391 executes the program in cooperation with the memory 392, and includes respective functional modules of the host controller 5. The communication port 394 performs network communication with the robot controller 4 and the data management device 6 in accordance with a command from a processor 391.

The data management device 6 has circuitry 490 that includes the at least one processor 491, a memory 492, a storage 493, a communication port 494, a monitor 495, and an input device 496. The storage 493 is a computer readable non-volatile storage medium (for example, hard disk or flash memory). The storage 493 includes a storage area of a program for configuring respective functional modules of the data management device 6, and storage areas allocated to the model storage 412, the interface storage 413, the data storage 416, the prediction data storage unit 418, the model storage 420 and the prediction formula storage 424. The memory 492 temporarily stores the program loaded from the storage 493, the calculation result by the processor 491, and the like. The processor 491 executes the program in cooperation with the memory 492, and includes respective functional modules of the data management device 6. The communication port 494 performs network communication with the host controller 5 and the communication management device 7 in accordance with a command from a processor 491. The monitor 495 is an image display device such as a liquid crystal monitor, and is used as the display unit 426 and the like, for example. The input device 496 is, for example, an information input device such as a keypad, and is used for acquiring a set value by the recommended time derivation unit 422. The monitor 495 and the input device 496 may be integrated as a so-called touch panel.

The communication management device 7 has circuitry 590 that includes at least one processor 591, a memory 592, a storage 593, a communication port 594, and a network adapter 595. The storage 593 is a computer readable non-volatile storage medium (for example, hard disk or flash memory). For example, the storage 593 includes a storage area for configuring the respective functional modules of the communication management device 7, and a storage area allocated to the read data storage 513. The memory 592 temporarily stores the program loaded from the storage 593, the calculation result by the processor 591, and the like. The processor 591 executes the program in cooperation with the memory 592, and includes respective functional modules of the communication management device 7. The communication port 594 performs network communication with the data management device 6 in accordance with a command from the processor 591. The network adapter 595 performs network communication via the network NW in accordance with a command from the processor 591.

2. Generation Method of Estimation Model

Examples will now be described of a generation method of an estimation model, a procedure for generating the estimation model, a procedure for evaluating the estimation model, and a procedure for outputting the estimation model, which are executed by the learning system 2.

(1) Procedure for Generating Estimation Model

Figure 7:
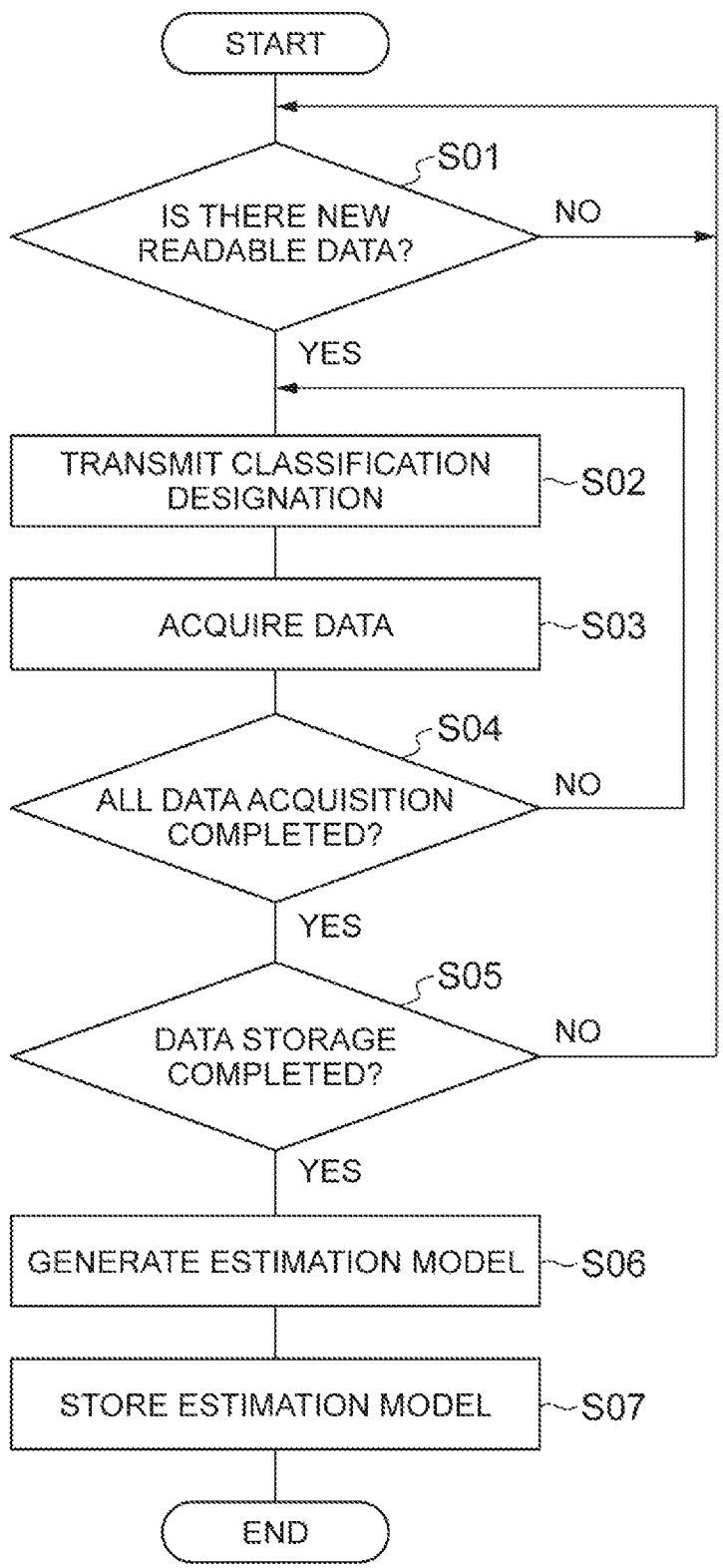
FIG. 7 is a flowchart illustrating an example procedure for constructing an estimation model.

As shown in FIG. 7, the learning system 2 first executes operation S01. In operation S01, the information extraction unit 111 waits for a new data to be stored in the read data storage 513. Whether the new data has been stored in the read data storage 513 can be validated by an inquiry to the information extraction unit 514 or a notification from the information extraction unit 514.

Next, the learning system 2 sequentially executes operations S02, S03, and S04. In operation S02, the information extraction unit 111 transmits the designation of the classification information to the communication restriction unit 516. In operation S03, the information extraction unit 111 acquires the data extracted from the read data storage 513 according to the designation in operation S02 from the communication restriction unit 516 and stores it in the information storage unit 112. In operation S04, the information extraction unit 111 validates whether all data constituting the learning data has been acquired. When it is determined in operation S04 that unacquired data remains, the learning system 2 returns the process to operation S02. Thereafter, the data extraction operation including designating the classification information is repeated until acquisition of all the data constituting the learning data is completed.

When it is determined in operation S04 that all data constituting the learning data has been acquired, the learning system 2 executes operation S05. In operation S05, the model generation unit 113 validates whether the number of learning data sufficient for machine learning has been stored in the information storage unit 112. When it is determined in operation S05 that the number of learning data sufficient for machine learning has not been stored, the learning system 2 returns the process to operation S01. Thereafter, the accumulation of the learning data is repeated until the sufficient number of learning data for the machine learning is stored.

When it is determined in operation S05 that the number of learning data sufficient for machine learning has been stored in the information storage unit 112, the learning system 2 executes operations S06 and S07 in order. In operation S06, the model generation unit 113 generates the estimation model by machine learning based on the learning data stored in the information storage unit 112. In operation S07, the model generation unit 113 stores the generated estimation model in the model storage 114. Thus, the procedure for generating the estimation model is completed. The learning system 2 repeatedly executes the above procedure.

(2) Procedure for Evaluating Estimation Model

Figure 8:
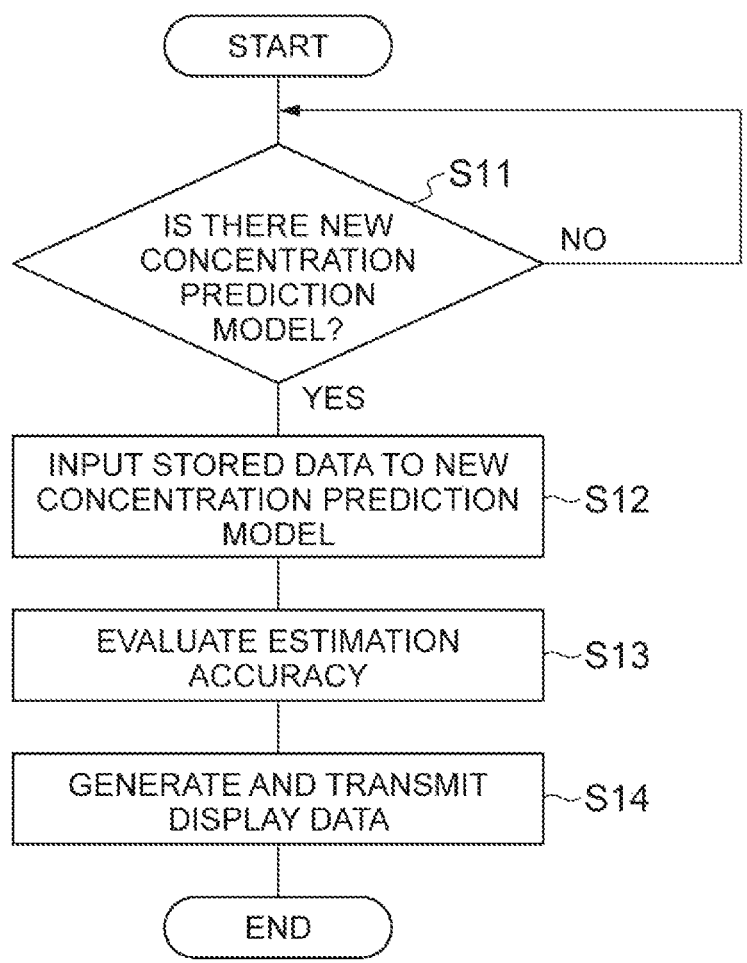
FIG. 8 is a flowchart illustrating an example procedure for evaluating an estimation model.

As shown in FIG. 8, the learning system 2 sequentially executes operations S11, S12, S13, and S14. In operation S11, the model evaluation unit 115 waits for a new estimation model to be stored in the model storage 114. In operation S12, the model evaluation unit 115 selects one of the learning data as sample data, and inputs the speed data and the torque data included in the sample data to an evaluation target model (an estimation model newly stored in the model storage 114) to derive the predicted concentration data. In operation S13, the model evaluation unit 115 compares the predicted concentration data derived in operation S12 with the measured concentration data included in the sample data, evaluates the estimation accuracy of the estimation models, and stores the evaluation result in the model storage 114. In operation S14, display data generation unit 116 generate data for displaying identification information of a plurality of estimation models and the evaluation result of the estimation accuracy of the a plurality of types estimation models, and the update information transmission unit 117 transmits the data to one of the nodes X of the factory system 3. Thus, the procedure for evaluating the estimation model is completed. The learning system 2 repeatedly executes the above procedure.

(3) Procedure for Outputting Estimation Model

Figure 9:
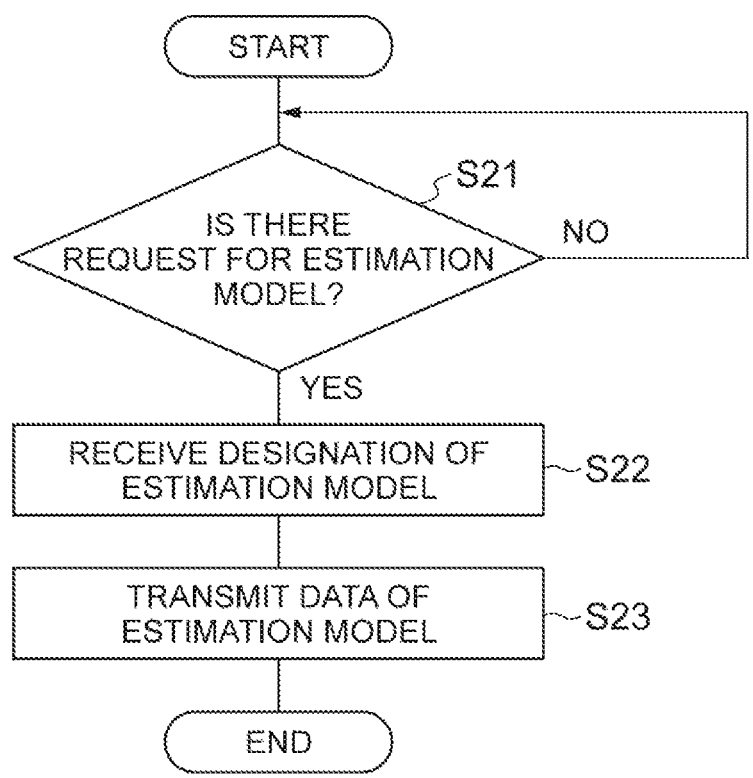
FIG. 9 is a flowchart illustrating an example output procedure of an estimation model.

As illustrated in FIG. 9, the learning system 2 sequentially executes operations S21, S22, and S23. In operation S21, the model output unit 118 waits for a transmission request for the estimation model to be transmitted from the communication restriction unit 516. In operation S22, the model output unit 118 acquires from the communication restriction unit 516 the designation of the type of the estimation model to be transmitted. In operation S23, the model output unit 118 transmits the data of the estimation model designated in operation S22 to the communication restriction unit 516. Thus, the procedure for outputting the estimation model is completed. The learning system 2 repeatedly executes the above procedure.

3. How to Transmit Data for Machine Learning

Next, as an example of a method of transmitting data for machine learning, a data construction procedure and a data transmission procedure executed by the communication management device 7 will be described.

(1) Data Construction Procedure

Figure 10:
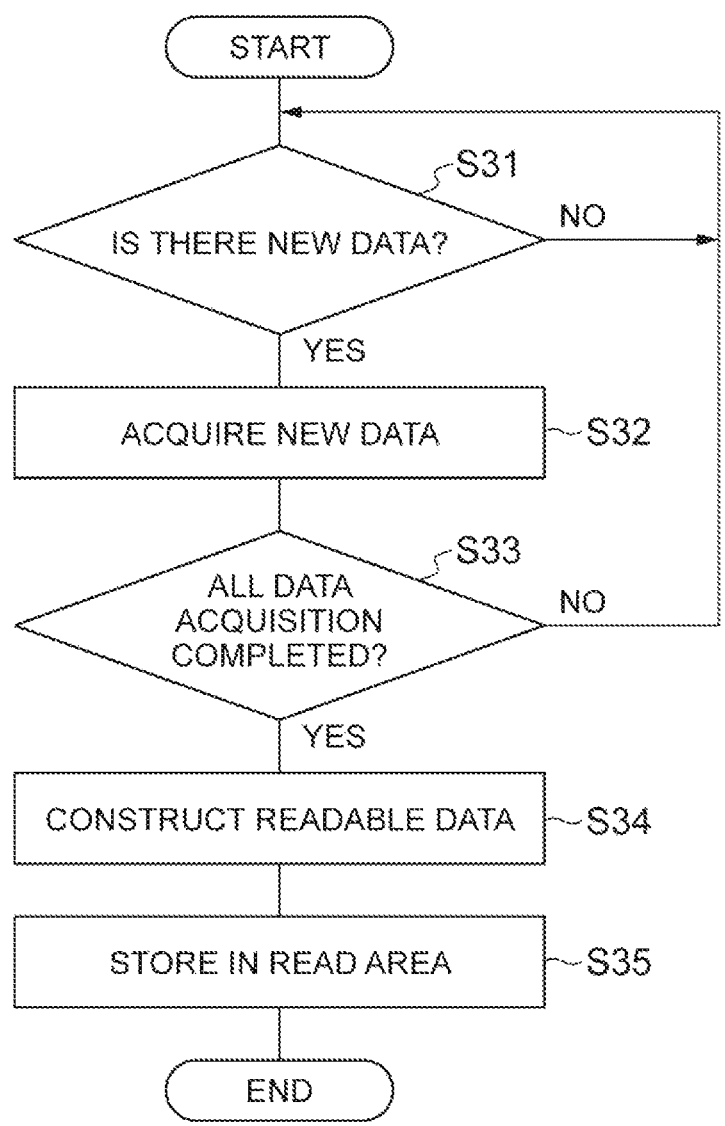
FIG. 10 is a flowchart illustrating an example procedure for constructing a data set.

As shown in FIG. 10, the communication management device 7 first executes operations S31, S32, and S33 in order. In operation S31, the data acquisition unit 511 waits for new data to be added to the data storage 416. In operation S32, the data acquisition unit 511 acquires new data added to the data storage 416. In operation S33, the data acquisition unit 511 validates whether acquisition of new data has been completed for the actuators 11, 12, 13, 14, 15, and 16 of all the robots 10. In operation S33, when it is determined that actuators 11, 12, 13, 14, 15, and 16 for which new data has not been acquired remain, the communication management device 7 returns the process to operation S31. Thereafter, the acquisition of new data is repeated until the acquisition of new data for the actuators 11, 12, 13, 14, 15, and 16 of all the robots 10 is completed.

In operation S33, when it is determined that acquisition of new data has been completed for the actuators 11, 12, 13, 14, 15, and 16 of all the robots 10, the communication management device 7 executes operations S34 and S35 in order. In operation S34, the data construction unit 512 constructs the data using the new data. In operation S35, the data construction unit 512 stores the data constructed in operation S34 in the read data storage 513. When existing data is stored in the read data storage 513, the data construction unit 512 saves the data constructed in operation S34 over the read data storage 513. This completes the data construction procedure. The communication management device 7 repeatedly executes the above procedure.

(2) Data Transmission Procedure

Figure 11:
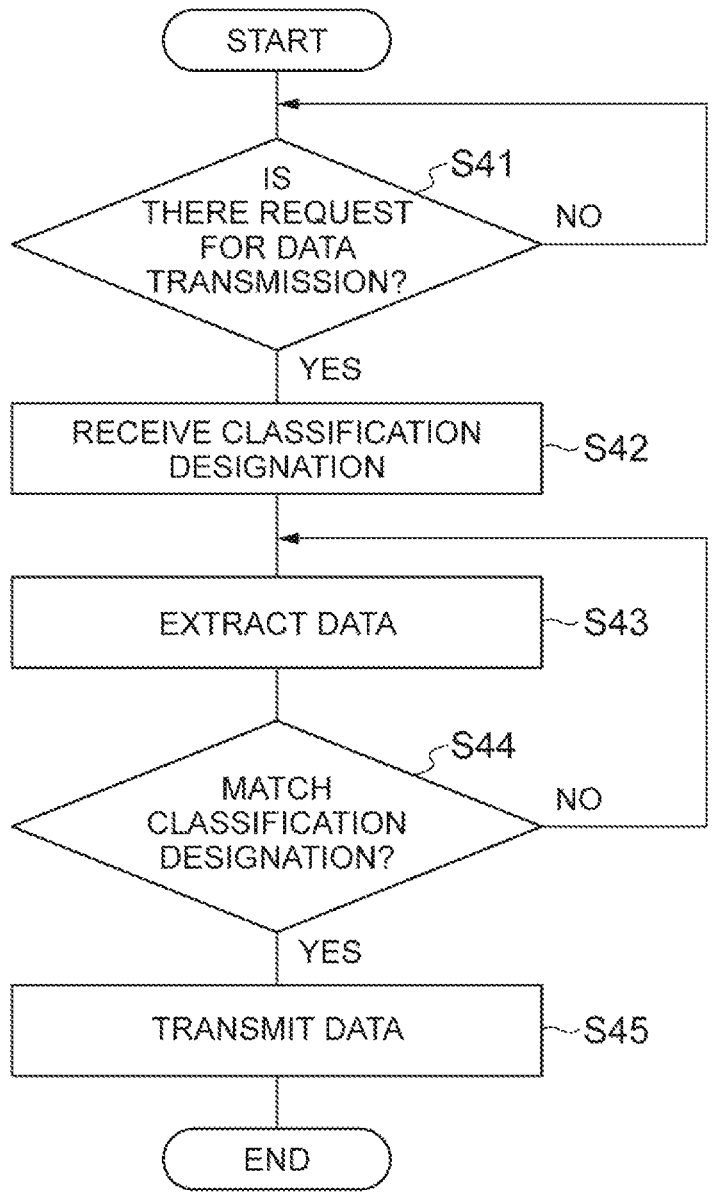
FIG. 11 is a flowchart illustrating an example procedure for transmitting data for machine learning.

As shown in FIG. 11, the communication management device 7 first executes operations S41, S42, S43, and S44 in order. In operation S41, the communication restriction unit 516 waits for a reception of a data transmission request from the information extraction unit 111. In operation S42, the communication restriction unit 516 receives the classification designation of the data to be transmitted. In operation S43, the information extraction unit 514 extracts data corresponding to the classification designation received in operation S42 from the data of the read data storage 513, and outputs it to the communication restriction unit 516. In operation S44, the communication restriction unit 516 validates whether the data acquired from the information extraction unit 514 matches the classification designation. In operation S44, when it is determined that the data acquired from the information extraction unit 514 does not match the classification designation, the communication management device 7 returns the process to operation S43. Thereafter, data extraction and data check are repeated until data matching the classification designation is extracted.

When it is determined in operation S44 that the data acquired from the information extraction unit 514 matches the classification designation, the communication management device 7 executes operation S45. In operation S45, the communication restriction unit 516 transmits to the information extraction unit 111 the data determined to match the classification designation. This completes the data transmission procedure. The communication management device 7 repeatedly executes the above procedure.

4. Estimation Method of Condition of Actuator

Examples will now be described of an estimation method of the condition of the actuator, the procedure for acquiring the data of the estimation model, the procedure for deriving the recommended time for maintenance based on the estimation model, and the procedure for deriving the recommended time for maintenance based on the prediction formula.

(1) Procedure for Acquiring Data of Estimation Model

Figure 12:
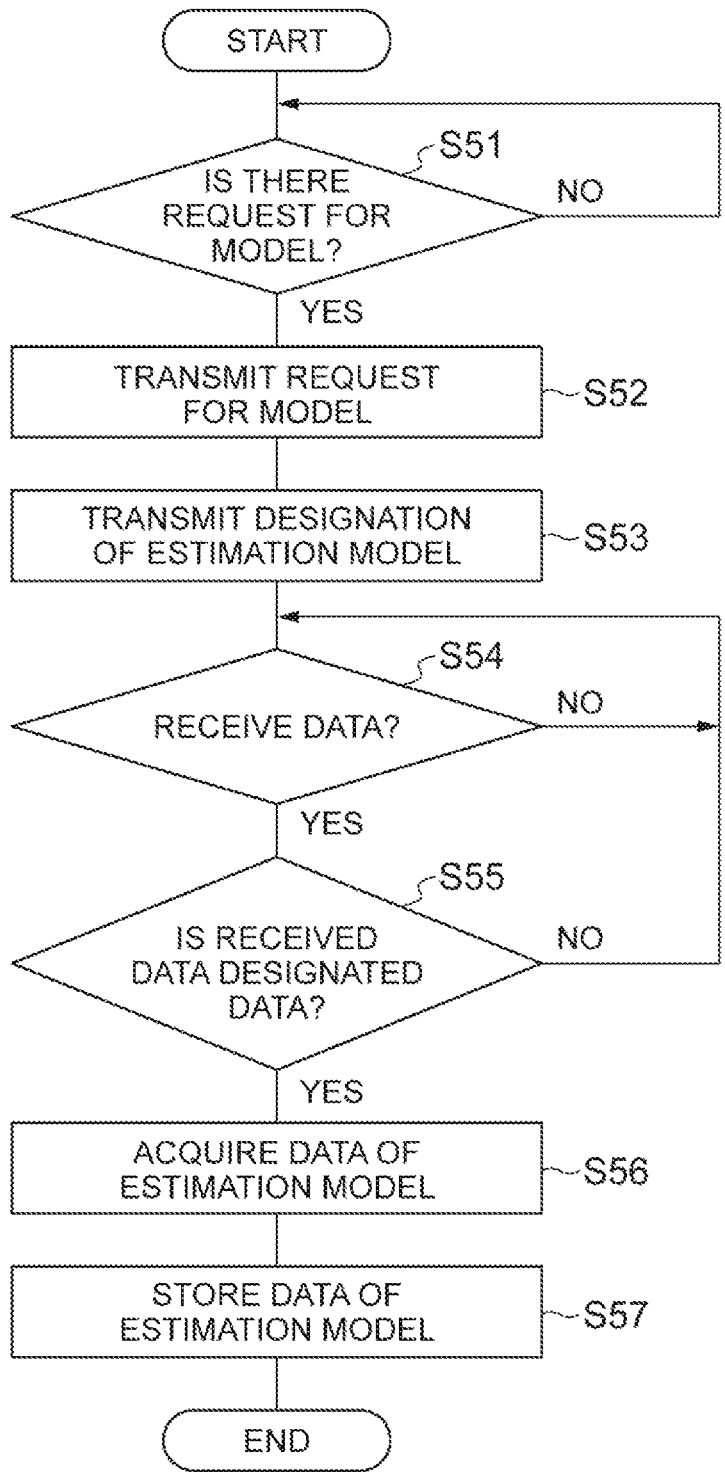
FIG. 12 is a flowchart illustrating an example procedure for acquiring data of an estimation model.

As shown in FIG. 12, the communication management device 7 first executes operations S51, S52, and S53 in order. In operation S51, the communication restriction unit 516 waits for a request for data of the estimation model from the model request unit 411. In operation S52, the communication restriction unit 516 transmits a transmission request for the estimation model to the model output unit 118. In operation S53, the communication restriction unit 516 acquires a designation of the type of the estimation model from the model request unit 411 and transmits the designation to the model output unit 118.

Next, the communication management device 7 executes operations S54 and S55. In operation S54, communication restriction unit 516 waits for a reception of data from the model output unit 118. In operation S55, the communication restriction unit 516 validates whether the data received from the model output unit 118 is the data of the estimation model designated by the model request unit 411. For example, the communication restriction unit 516 validates whether the received data is the data of the designated estimation model based on the identification information included in the data received from the model output unit 118. When it is determined in operation S55 that the received data is not the data of the designated estimation model, the communication management device 7 returns the process to operation S54. Thereafter, data reception and data check are repeated until the data of the designated estimation model is received.

When it is determined in operation S55 that the received data is the data of the designated estimation model, the communication management device 7 executes operations S56 and S57 in order. In operation S56, the model acquisition unit 515 acquires the data of the estimation model received by the communication restriction unit 516. In operation S57, the model acquisition unit 515 stores the data of the estimation model acquired in operation S56 in the model storage 412 of the data management device 6. Thus, the procedure for acquiring the data of the estimation model is completed. The communication management device 7 repeatedly executes the above procedure.

Figure 13:
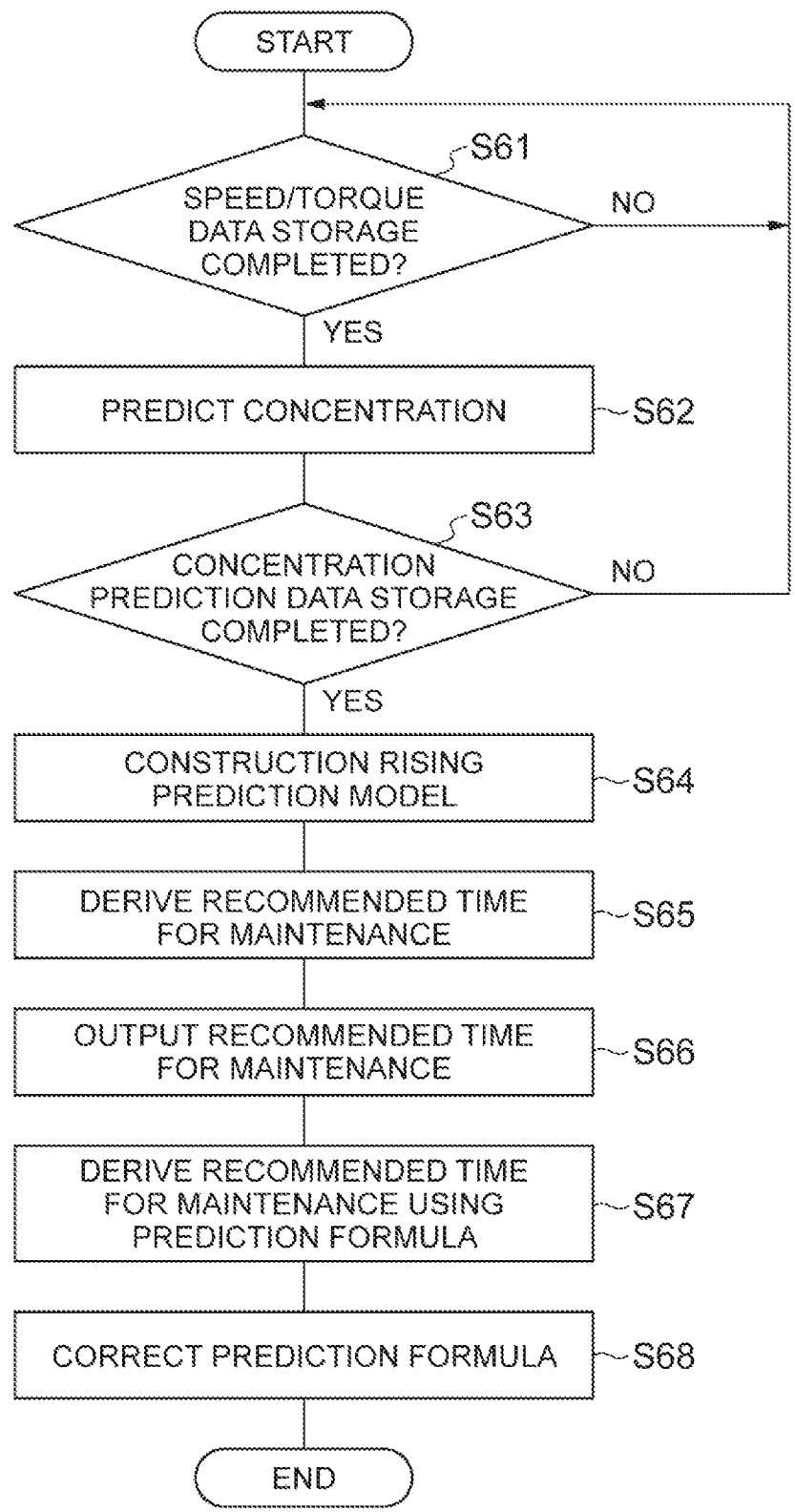
FIG. 13 is a flowchart illustrating an example procedure for deriving a recommended time for maintenance based on an estimation model.

(2) Procedure for Deriving Recommended Time for Maintenance Based on Estimation Model As shown in FIG. 13, the data management device 6 first executes operations S61, S62, and S63 in order. In operation S61, the estimation unit 417 waits for the new input data (input data not used for deriving the predicted concentration data) to be stored in the data storage 416. In operation S62, the estimation unit 417 inputs the new input data to the estimation model of the model storage 412, and derives the predicted concentration data. After that, the estimation unit 417 stores the predicted concentration data in the prediction data storage unit 418. In operation S63, the model construction unit 419 determines whether the predetermined number of new predicted concentration data (unused predicted concentration data in the model construction unit 419) has been stored in the prediction data storage unit 418. When it is determined that the number of stored new predicted concentration data does not reach the predetermined number, the data management device 6 returns the process to operation S61. Thereafter, the derivation and storage of the predicted concentration data are repeated until it is determined that the predetermined number of new predicted concentration data has been stored in the prediction data storage unit 418.

In operation S63, when it is determined that the predetermined number of new predicted concentration data has been stored in the prediction data storage unit 418, the data management device 6 executes operation S64. In operation S64, the model construction unit 419 constructs a rising prediction model of the predicted concentration data based on the predetermined number of new predicted concentration data.

Next, the data management device 6 executes operation S65. In operation S65, the recommended time derivation unit 421 derives the first recommended time (recommended time for maintenance of the speed reducer 22 based on the estimation model) based on the rising prediction model. Next, the data management device 6 executes operation S66. In operation S66, the display data generation unit 425 generates image data for displaying the first recommended time, and the display unit 426 displays an image including the first recommended time based on the image data.

Next, the data management device 6 sequentially executes operations S67 and S68. In operation S67, the recommended time derivation unit 422 derives the second recommended time (recommended time for maintenance of the speed reducer 22 based on the prediction formula) based on the prediction formula. In operation S68, the prediction formula correction unit 423 corrects the prediction formula to make the second recommended time closer to the first recommended time. For example, the prediction formula correction unit 423 corrects the value of the correction coefficient A by multiplying the ratio between the second recommended time calculated in operation S67 and the first recommended time calculated in operation S65. As described above, the procedure for deriving the recommended time for maintenance based on the estimation model is completed. The data management device 6 repeatedly executes the above procedure.

Figure 14:
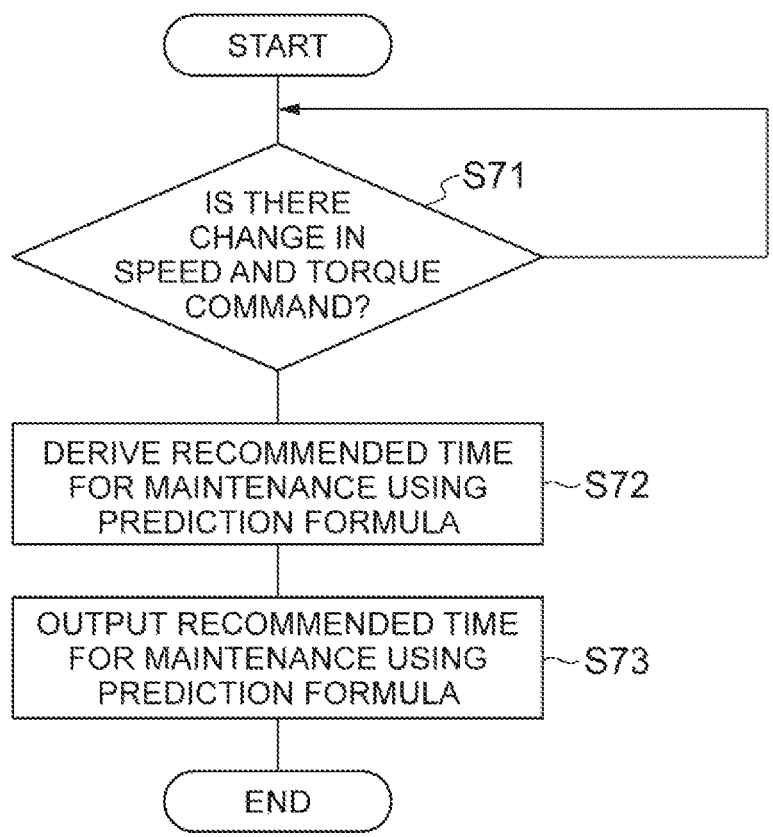
FIG. 14 is a flowchart illustrating an example procedure for deriving a recommended time for maintenance based on a prediction formula.

(3) Procedure for Deriving the Recommended Time for Maintenance Based on Prediction Formula As illustrated in FIG. 14, the data management device 6 sequentially executes operations S71, S72, and S73. In operation S71, the recommended time derivation unit 422 waits for input of the set values of the rotational speed and the torque of the speed reducer 22. In operation S72, the recommended time derivation unit 422 derives the second recommended time based on the input set value and the prediction formula corrected by the prediction formula correction unit 423. For example, the recommended time derivation unit 422 derives the second recommended time based on the above formula (1). In operation S73, the display data generation unit 425 generates image data for displaying the second recommended time, and the display unit 426 displays an image including the second recommended time based on the image data. The display data generation unit 425 may generate image data for displaying both the first recommended time and the second recommended time. Thus, the procedure for deriving the recommended time for maintenance based on the prediction formula is completed. The data management device 6 repeatedly executes the above-described procedure for deriving the recommended time for maintenance.

The control system 1 includes the factory system 3 configured to control actuators 11, 12, 13, 14, 15, and 16, and the learning system 2 configured to extract information for machine learning associated with actuators 11, 12, 13, 14, 15, and 16 from factory system 3 via network NW and to generate an estimation model of the condition of the actuators 11, 12, 13, 14, 15, and 16 by machine learning using the information. The factory system 3 includes a plurality of nodes X including a robot controller 4 controlling the actuators 11, 12, 13, 14, 15, and 16 and the host controller 5, and the communication management device 7 connected to the learning system 2 via the network NW. The communication management device 7 includes the data acquisition unit 511 that acquires information for machine learning from one of the nodes X other than the communication management device 7, and the data construction unit 512 that constructs a data including the information acquired by the data acquisition unit 511 and makes the data readable from the learning system 2.

In some examples, information for machine learning may be provided from the factory system 3 to the learning system 2 without network access to the robot controller 4 and the host controller 5. For this reason, both the continued reliability of the robot controller 4 and the host controller 5 and the efficiency of collecting information for machine learning may be achieved. Therefore, it is effective in expanding the use of machine learning in the factory system 3.

The data acquisition unit 511 may acquire information for machine learning read out from the host controller 5 by an interface program for accessing data in the host controller 5, and the interface program may be stored in the interface storage 413 provided in any of the nodes X which are isolated from the network NW by the communication management device 7. Accordingly, accidental access to a storage area that is different from the area configured to store the information by acquiring the information for machine learning read out by the interface program may be suppressed. Also, by arranging the interface program in the interface storage 413 of the node X isolated from the network NW by the communication management device 7, network access to the host controller 5 may be restricted, and the reliability of the host controller 5 may be securely maintained.

The plurality of nodes X may include an additional node X other than the communication management device 7, the robot controller 4 and the host controller 5. For example, the additional node X may include the interface storage 413.

The data acquisition unit 511 may acquire the information for machine learning associated with a plurality of the actuators 11, 12, 13, 14, 15, and 16, wherein the data construction unit 512 may construct the data obtained by structuring information acquired by the data acquisition unit 511 by classification information including identification information of the actuators 11, 12, 13, 14, 15, and 16. Additionally, the learning system 2 may include the information extraction unit 111 configured to extract the information for machine learning from the data by designating the classification information, the information storage unit 112 configured to store the information for machine learning extracted by the information extraction unit 111, and the model generation unit 113 configured to generate the estimation model by machine learning using information stored in the information storage unit 112. Accordingly, the efficiency of collecting information for machine learning may be further improved.

One of the plurality of nodes X may include the model storage 412 configured to store data of an estimation model generated by the learning system 2, and one of the plurality of nodes X may include the estimation unit 417 configured to estimate the condition of the actuators 11, 12, 13, 14, 15, and 16 based on an estimation model stored in the model storage 412. In some example, the frequency of data transmission from the learning system 2 to the factory system 3 decreases, compared to when applying the estimation model arranged in the learning system 2 to the estimation of the conditions of the actuators 11, 12, 13, 14, 15, and 16. Therefore, the reliability of the robot controller 4 and the host controller 5 may be more securely maintained.

The estimation unit 417 may estimate the deterioration level of the actuators 11, 12, 13, 14, 15, and 16. One of the nodes X may further include the parameter adjustment unit 314 for adjusting the control parameter of the actuators 11, 12, 13, 14, 15, and 16 based on the estimation result of the conditions of the actuators 11, 12, 13, 14, 15, and 16 by the estimation unit 417.

The learning system 2 may include the model storage 114 configured to store a plurality of the estimation models generated by the model generation unit 113, and the model evaluation unit 115 configured to evaluate an estimation accuracy of each of the estimation models based on information stored in the information storage unit 112 and estimation results of the conditions of the actuators 11, 12, 13, 14, 15, and 16 by the plurality of estimation models. Additionally, the learning system 2 may include the display data generation unit 116 configured to generate data for displaying identification information of the plurality of estimation models and an evaluation result of an estimation accuracy of the plurality of estimation models. In some examples, an estimation model may be provided by visualizing a plurality of estimation models and evaluation results and enabling selective acquisition of the estimation model based on a desired result.

The model evaluation unit 115 may include the evaluation data derivation unit 121 configured to input part of information stored in the information storage unit 112 to the estimation models to derive data for evaluation, and the accuracy evaluation unit 122 configured to compare data derived by the evaluation data derivation unit 121 with information of a condition of the actuators 11, 12, 13, 14, 15, and 16 included in information stored in the information storage unit 112 to evaluate an estimation accuracy of the estimation models. Accordingly, the estimation model may be quickly evaluated by utilizing existing data for evaluating the estimation model.

The learning system 2 may include the model output unit 118 configured to receive a designation of a type of the estimation model from one of the nodes X of the factory system 3 and to transmit, to the one of the nodes X, data of the estimation model according to the designation. Accordingly, a request for selective transmission of the estimation model based on the evaluation result of the estimation model is enabled, and the frequency of data transmission to the factory system 3 may be further reduced.

The control system 1 includes the factory system 3 configured to control the actuators 11, 12, 13, 14, 15, and 16, and the learning system 2 configured to extract information for machine learning associated with the actuators 11, 12, 13, 14, 15, and 16 from the factory system 3 via the network NW, and to generate an estimation model of a condition of the actuators 11, 12, 13, 14, 15, and 16 by machine learning using the information. In some examples, the factory system 3 includes a plurality of nodes X including the robot controllers 4 that are nodes controlling the actuators 11, 12, 13, 14, 15, and 16 and the host controller 5, one of the plurality of nodes X includes the model storage 412 configured to store the estimation model generated by the learning system 2, and one of the plurality of nodes X includes the estimation unit 417 configured to estimate a condition of the actuators 11, 12, 13, 14, 15, and 16 based on the estimation model stored in the model storage 412. Accordingly, both long-term machine learning and real-time utilization of the learning result in control may be achieved. Therefore, it is effective in expanding the use of machine learning in the factory system 3.

One of the plurality of nodes X may include a model request unit 411 configured to request the learning system 2 to transmit data of the estimation model, and one of the plurality of nodes X may include the model acquisition unit 515 configured to acquire the data of the estimation model transmitted according to a request from the model request unit 411. The transmission timing of the model data from the learning system 2 to the factory system 3 may be determined on the factory system 3 side, so that the frequency of unexpected data transmission to the factory system 3 may be reliably reduced.

Any of the plurality of nodes X may include the communication restriction unit 516 configured to restrict acquisition of data that is different from the data associated with a request from the model request unit 411 in order to reliably reduce the frequency of unexpected data transmission to the factory system 3.

Figure 15:
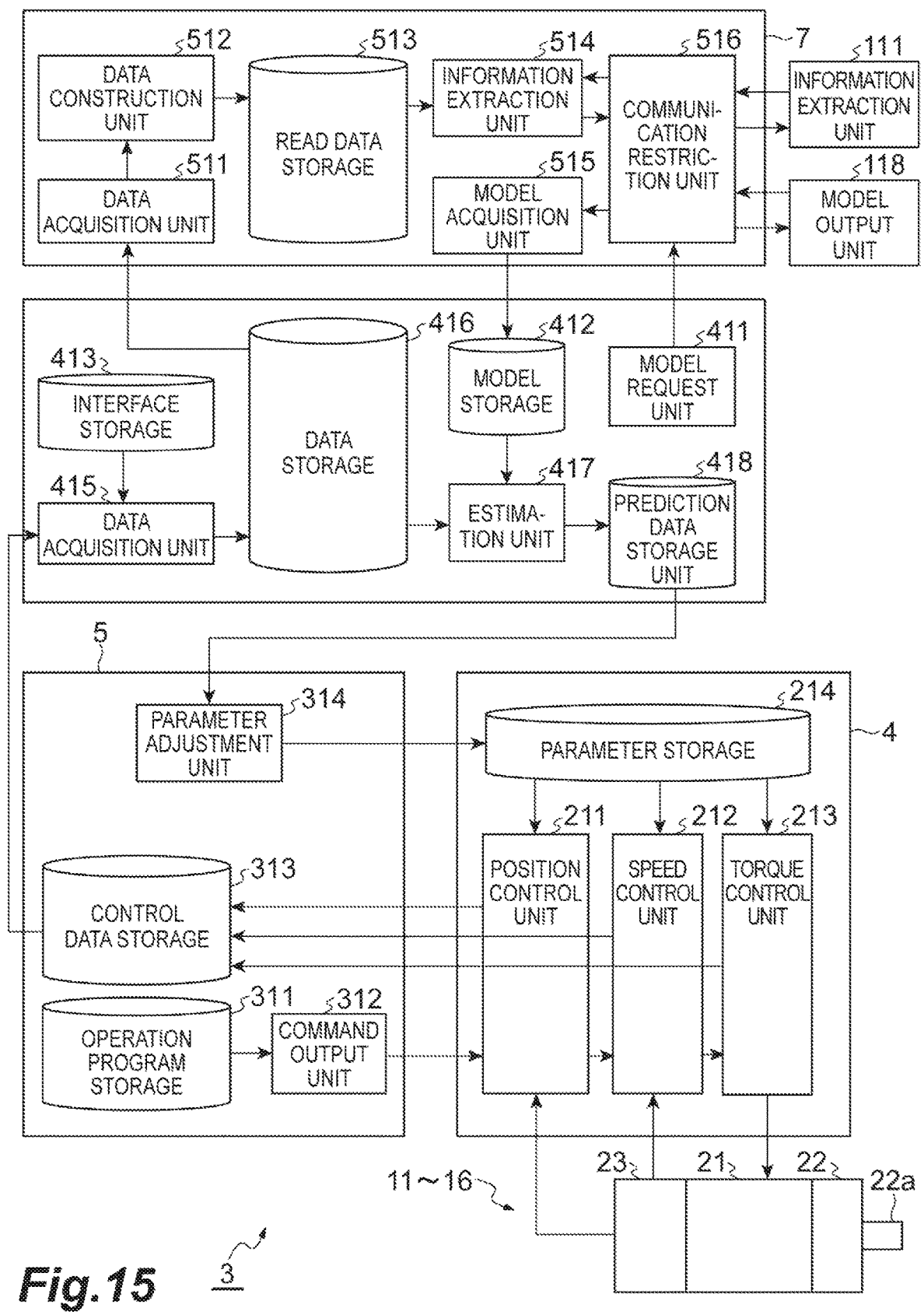
FIG. 15 is a block diagram illustrating another example configuration of a factory system.

It is to be understood that not all aspects, advantages and features described herein may necessarily be achieved by, or included in, any one particular example embodiment. Indeed, having described and illustrated various examples herein, it should be apparent that other examples may be modified in arrangement and detail. For example, any of the nodes X may further include the parameter adjustment unit for adjusting the control parameter of the actuators 11, 12, 13, 14, 15, and 16 based on the estimation result of the conditions of the actuators 11, 12, 13, 14, 15, and 16 by the estimation unit 417. Specifically, in the factory system 3 illustrated in FIG. 15, the robot controller 4 may further include a parameter storage 214, and the host controller 5 may further include a parameter adjustment unit 314. The parameter storage 214 may be configured to store various control parameters (for example, a position control gain, a speed control gain, a torque control gain, and the like). The position control unit 211, the speed control unit 212, and the torque control unit 213 may be configured to execute the above-described control according to the control parameters stored in the parameter storage 214. Additionally, the parameter adjustment unit 314 may be configured to adjust the control parameters of the actuators 11, 12, 13, 14, 15, and 16 stored in the parameter storage 214 based on the estimation result of the conditions of the actuators 11, 12, 13, 14, 15, and 16 by the estimation unit 417.

Further, the node configuration of the factory system 3 may include control devices such as the robot controller 4 and the host controller 5, and the communication management device 7. For example, at least part of the function of the data management device 6 may be incorporated in the host controller 5, or all functions of the data management device 6 may be incorporated in the host controller 5.

Although certain procedures or operations are described herein as being performed sequentially or in a particular order, in some examples one or more of the operations may be performed in a different order, in parallel, simultaneously with each other, or in an overlapping manner. Additionally, in some examples, one or more of the operations may be optionally performed or, in some cases, omitted altogether.

We claim all modifications and variations coming within the spirit and scope of the subject matter claimed herein.

Regarding the above embodiments, the following appendices are appended.

(Appendix 1) A control system comprising:
a factory system configured to control an actuator; and
a learning system configured to extract information for machine learning associated with the actuator from the factory system via a network and to generate an estimation model of a condition of the actuator by machine learning using the information, wherein the factory system includes a plurality of nodes including a control device to control the actuator, and a readable data construction device connected to the learning system via the network, and
wherein the readable data construction device includes:
an acquisition unit configured to acquire the information for machine learning from one of the nodes other than the readable data construction device, and
a data construction unit configured to construct data including information acquired by the acquisition unit and make the data readable from the learning system.

(Appendix 2) The control system according to appendix 1, wherein the acquisition unit acquires the information for machine learning read out from the control device by an interface program for accessing data in the control device, and
wherein the interface program is stored in an interface storage provided in one of the nodes which is, among the plurality of nodes, isolated from the network by the readable data construction device.

(Appendix 3) The control system according to appendix 2, wherein the plurality of nodes includes an additional node other than the readable data construction device and the control device, and wherein the additional node includes the interface storage.

(Appendix 4) The control system according to any one of appendices 1 to 3,
wherein the acquisition unit acquires the information for machine learning associated with a plurality of the actuators including the actuator,
wherein the data construction unit constructs the data obtained by structuring information acquired by the acquisition unit by classification information including identification information of the actuators, and
wherein the learning system includes:
an information extraction unit configured to extract the information for machine learning from the data by designating the classification information, an information storage unit configured to store the information for machine learning extracted by the information extraction unit, and a model generation unit configured to generate the estimation model by machine learning using information stored in the information storage unit.

(Appendix 5) The control system according to any one of appendices 1 to 4, wherein one of the plurality of nodes includes a first model storage configured to store data of the estimation model generated by the learning system, and wherein one of the plurality of nodes includes an estimation unit configured to estimate a condition of the actuator based on the estimation model stored in the first model storage.

(Appendix 6) The control system according to appendix 5, wherein the estimation unit is configured to estimate a deterioration level of the actuator.

(Appendix 7) The control system according to appendix 5 or 6, wherein one of the plurality of nodes further includes a parameter adjustment unit configured to adjust a control parameter of the actuator based on an estimation result of the condition of the actuator by the estimation unit.

(Appendix 8) The control system according to appendix 4, wherein the learning system includes:

a second model storage configured to store a plurality of estimation models including the estimation model generated by the model generation unit, a model evaluation unit configured to evaluate an estimation accuracy of each of the estimation models based on information stored in the information storage unit and estimation results of the condition of the actuators by the plurality of estimation models, and a display data generation unit configured to generate data for displaying identification information of the plurality of estimation models and an evaluation result of an estimation accuracy of the plurality of estimation models.

(Appendix 9) The control system according to appendix 8, wherein the model evaluation unit includes:

an evaluation data derivation unit configured to input part of information stored in the information storage unit to the estimation models to derive data for evaluation, and an accuracy evaluation unit configured to compare data derived by the evaluation data derivation unit with information of a condition of the actuators included in information stored in the information storage unit to evaluate an estimation accuracy of the estimation models.

(Appendix 10) The control system according to appendix 8 or 9, wherein the learning system further includes a model output unit configured to:

receive a designation of a type of the estimation model from one of the nodes of the factory system; and transmit, to the one of the nodes, data of the estimation model according to the designation.

(Appendix 11) A control system comprising:

a factory system configured to control an actuator; and a learning system configured to extract information for machine learning associated with the actuator from the factory system via a network and generate an estimation model of a condition of the actuator by machine learning using the information, wherein the factory system includes a plurality of nodes including a control device controlling the actuator, wherein one of the plurality of nodes includes a first model storage configured to store the estimation model generated by the learning system, and wherein one of the plurality of nodes includes an estimation unit configured to estimate a condition of the actuator based on the estimation model stored in the first model storage.

(Appendix 12) The control system according to appendix 11, wherein one of the plurality of nodes includes a model request unit configured to request the learning system to transmit data of the estimation model, and wherein one of the plurality of nodes includes a model acquisition unit configured to acquire data of the estimation model transmitted according to a request from the model request unit.

(Appendix 13) The control system according to appendix 12, wherein one of the plurality of nodes includes a communication restriction unit configured to restrict acquisition of data different from data according to a request from the model request unit.

(Appendix 14) The control system according to any one of appendices 11 to 13, wherein the learning system includes:

an information storage unit configured to store the information for machine learning extracted from the factory system, a model generation unit configured to generate the estimation model by machine learning using information stored in the information storage unit, a second model storage configured to store a plurality of estimation models including the estimation model generated by the model generation unit, a model evaluation unit configured to evaluate an estimation accuracy of each of the estimation models based on information stored in the information storage unit and an estimation result of the condition of the actuator by the plurality of estimation models, and a display data generation unit configured to generate data for displaying identification information of the plurality of estimation models and an evaluation result of an estimation accuracy of the plurality of estimation models.

(Appendix 15) A factory system connected to a learning system for machine learning via a network, the factory system comprising:

a plurality of nodes including a control device configured to control an actuator, and a readable data construction device connected to the learning system via the network, wherein the readable data construction device includes:

an acquisition unit configured to acquire information for machine learning from the control device, and a data construction unit configured to construct data including information acquired by the acquisition unit and make the data readable from the learning system.

(Appendix 16) A factory system connected to a learning system for machine learning via a network, the factory system comprising:

a plurality of nodes including a control device configured to control an actuator, wherein one of the plurality of nodes includes a first model storage configured to store an estimation model of a condition of the actuator generated by the learning system, and wherein one of the plurality of nodes includes an estimation unit configured to estimate a condition of the actuator based on the estimation model stored in the first model storage.

(Appendix 17) A learning system comprising:

an information extraction unit configured to acquire information for machine learning associated with a plurality of actuators from a control device of the plurality of actuators, the information extraction unit being connected via a network to a readable data construction device that constructs a data obtained by structuring acquired information by classification information including identification information of the actuators, the information extraction unit being configured to extract the information for machine learning from the data by designating the classification information;

an information storage unit configured to store the information for machine learning extracted by the information extraction unit; and a model generation unit configured to generate an estimation model of a condition of the actuators by machine learning using information stored in the information storage unit.

(Appendix 18) The learning system according to appendix 17, further comprising:

a second model storage configured to store a plurality of estimation models including the estimation model generated by the model generation unit;

a model evaluation unit configured to evaluate an estimation accuracy of each of the estimation models based on information stored in the information storage unit and an estimation result of the condition of the actuators by the plurality of estimation models; and a display data generation unit configured to generate data for displaying identification information of the plurality of estimation models and an evaluation result of an estimation accuracy of the plurality of estimation models.

(Appendix 19) A generation method of an estimation model, the method comprising:

acquiring information for machine learning associated with a plurality of actuators from a control device of the plurality of actuators, by a learning system connected via a network to a readable data construction device that constructs a data obtained by structuring acquired information by classification information including identification information of the actuators, designating the classification information, and extracting the information for machine learning from the data set;

storing the acquired information for machine learning in the learning system; and by machine learning using the information for machine learning stored in the learning system, generating an estimation model of a condition of the actuators by the learning system.

(Appendix 20) The generation method of an estimation model according to appendix 19, further comprising:

storing a plurality of generated estimation models including the estimation model in the learning system;

evaluating an estimation accuracy of each of the estimation models based on the information for machine learning stored in the learning system and an estimation result of the condition of the actuators by the plurality of estimation models; and generating data for displaying identification information of the plurality of estimation models and an evaluation result of an estimation accuracy of the plurality of estimation models.

(Appendix 21) An estimation method of a condition of an actuator, the method comprising:

by a readable data construction device of a factory system including a control device configured to control the actuator and the readable data construction device connected to a learning system via a network, acquiring information for machine learning associated with the actuator from the control device, constructing a data containing the acquired information, and making the data readable from the learning system; and estimating a condition of the actuator by the factory system based on an estimation model of a condition of the actuator generated by the learning system by machine learning using information extracted from the data set.

(Appendix 22) An estimation method of a condition of an actuator, the method comprising:

acquiring an estimation model of a condition of the actuator generated by machine learning in a learning system from the learning system via a network and storing the estimation model in a factory system; and estimating a condition of the actuator by the factory system based on the estimation model stored in the factory system.

What is claimed is:

1. A control system comprising:

a factory system configured to control an actuator; and a learning system configured to extract records for machine learning associated with the actuator from the factory system via a network and to generate an estimation model for estimating a condition of the actuator by machine learning using the records, wherein the factory system includes a plurality of nodes including a control device to control the actuator, and a readable data construction device connected to the learning system via the network, wherein the readable data construction device is configured to:

acquire data items associated with the actuator from at least one of the nodes other than the readable data construction device; and construct readable data which is readable from the learning system, the readable data including the data items associated with the actuator, and wherein the learning system is configured to:

extract the records from the readable data;

store the records for machine learning in a record storage;

generate the estimation model by machine learning using information stored in the record storage, store a plurality of estimation models including the estimation model;

evaluate an estimation accuracy of each of the estimation models based, at least in part, on the records for machine learning stored in the record storage and estimation results of the condition of the actuator by the plurality of estimation models;

generate display data including an evaluation result of the estimation accuracy;

receive a model designation from at least one of the nodes of the factory system; and transmit, to the at least one of the nodes, one of the plurality of estimation models according to the model designation.

2. The control system according to according to claim 1, wherein the readable data construction device is further configured to store the readable data in a data memory that is accessible from the learning system via the network.

3. The control system according to according to claim 1, wherein the estimation model is configured to output an estimation of the condition of the actuator in response to an input of a status of motion of the actuator, and
wherein at least one of the records includes:
at least one data item indicating the status of motion; and
at least one data item indicating the condition of the actuator.

4. The control system according to claim 3,
wherein at least one of the plurality of nodes includes a model storage configured to store the transmitted estimation model, and
wherein at least one of the plurality of nodes is configured to estimate the condition of the actuator based, at least in part, on a present value of at least one of the data items indicating a state of motion of the actuator and the transmitted estimation model stored in the model storage.

5. The control system according to claim 4, wherein at least one of the plurality of nodes is further configured to estimate a deterioration level of the actuator based, at least in part, on the present value and the transmitted estimation model.

6. The control system according to claim 1,
wherein the readable data construction device is further configured to acquire the data items read out, at least in part, from the control device by an interface program for accessing data in the control device, and
wherein the interface program is stored in an interface storage provided in at least one of the nodes which is isolated from the network by the readable data construction device.

7. The control system according to claim 6, wherein the interface program is an application programming interface configured to read out predetermined data items from the storage of the control device.

8. The control system according to claim 6,
wherein the plurality of nodes includes an additional node other than the readable data construction device and the control device, and
wherein the additional node includes the interface storage.

9. The control system according to claim 1,
wherein the readable data construction device is further configured to:
acquire data items associated with a plurality of the actuators including the actuator; and
construct the readable data including the data items in association with labels, each of the labels including identification information of at least one of the plurality of actuators, and
wherein the learning system is further configured to extract the records for machine learning from the readable data by designating a label and read out a data item corresponding to the label in the readable data.

10. The control system according to claim 1,
wherein at least one of the plurality of nodes includes a model storage configured to store the transmitted estimation model, and
wherein at least one of the plurality of nodes is configured to estimate the condition of the actuator based, at least in part, on the transmitted estimation model stored in the model storage.

11. The control system according to claim 10,
wherein at least one of the plurality of nodes is further configured to adjust a control parameter of the actuator based, at least in part, on an estimation result of the condition of the actuator, and
wherein the control device is configured to control the actuator based, at least in part, on the control parameter.

12. The control system according to claim 1, wherein the learning system is further configured to:
select a sample record from the records for machine learning stored in the record storage;
input at least one data item of the sample record indicating a status of motion of the actuator to the estimation models to derive the estimation results; and
compare the estimation results which are derived with at least one data item of the sample record indicating the condition of the actuator to evaluate an estimation accuracy of the estimation models.

13. The control system according to claim 1, wherein at least one of the plurality of nodes is configured to restrict a transmission of data, from the learning system to the factory system, that is different from the estimation model corresponding to the model designation.

14. A factory system connected to a learning system for machine learning via a network, the factory system comprising:
a plurality of nodes including a control device configured to control an actuator, and a readable data construction device connected to the learning system via the network, wherein the readable data construction device is configured to:
acquire data items associated with the actuator from at least one of the nodes other than the readable data construction device; and
construct readable data which is readable from the learning system, the readable data including the data items,
wherein the learning system is configured to:
extract records for machine learning from the readable data;
store the records for machine learning in a record storage;
generate an estimation model for estimating a condition of the actuator based, at least in part, on the records for machine learning;
store a plurality of estimation models including the estimation model;
evaluate an estimation accuracy of each of the estimation models based, at least in part, on the records for machine learning stored in the record storage and estimation results of the condition of the actuator by the plurality of estimation models;
generate display data including an evaluation result of the estimation accuracy;
receive a model designation from at least one of the nodes of the factory system; and
transmit, to the at least one of the nodes, one of the plurality of estimation models according to the model designation, and
wherein at least one of the plurality of nodes is configured to estimate the condition of the actuator based, at least in part, on the transmitted estimation model.

15. The factory system according to claim 14, wherein the readable data construction device is further configured to put the readable data in a data memory that is accessible from the learning system via the network.

16. A factory system according to claim 14,
wherein at least one of the plurality of nodes includes a model storage configured to store the transmitted estimation model, and
wherein the condition is estimated based, at least in part, on the transmitted estimation model stored in the model storage.

17. The factory system according to claim 14, wherein at least one of the plurality of nodes is configured to restrict a transmission of data, from the learning system to the factory system, that is different from the estimation model corresponding to the model designation.

18. A method comprising:
acquiring data items associated with an actuator of a factory system from at least one of a plurality of nodes of the factory system, the plurality of nodes including a control device to control the actuator;
constructing readable data which is readable from a learning system, the readable data including the data items;
storing the readable data in a data memory which is accessible from a learning system via a network, wherein the learning system extracts records for machine learning from the readable data and generates an estimation model for estimating a condition of the actuator based, at least in part, on the records for machine learning;
storing a plurality of estimation models including the estimation model;
evaluating an estimation accuracy of each of the estimation models based, at least in part, on the records for machine learning stored in a record storage and estimation results of the condition of the actuator by the plurality of estimation models;
generating display data including an evaluation result of the estimation accuracy;
receiving a model designation from at least one of the nodes of the factory system;
transmitting, to the at least one of the nodes, one of the plurality of estimation models according to the model designation; and
estimating the condition of the actuator based, at least in part, on the transmitted estimation model.

19. The method according to claim 18, further comprising:
acquiring the transmitted estimation model from the learning system via the network; and
storing the transmitted estimation model in a model storage,
wherein estimating the condition includes estimating the condition based, at least in part, on the transmitted estimation model stored in the model storage.

20. The method according to claim 18, wherein at least one of the plurality of nodes is configured to restrict a transmission of data, from the learning system to the factory system, that is different from the estimation model corresponding to the model designation.

\* \* \* \* \*